US008676596B1

(12) United States Patent
Franson et al.

(10) Patent No.: US 8,676,596 B1
(45) Date of Patent: Mar. 18, 2014

(54) STIMULATING REVIEWS AT A POINT OF SALE

(71) Applicant: Reputation.com, Inc., Redwood City, CA (US)

(72) Inventors: Brent Michael Franson, San Francisco, CA (US); Jeffrey James Piper, Menlo Park, CA (US); Thomas Gerardo Dignan, Mountain View, CA (US)

(73) Assignee: Reputation.com, Inc., Redwood City, CA (US)

( * ) Notice: Subject to any disclaimer, the term of this patent is extended or adjusted under 35 U.S.C. 154(b) by 0 days.

(21) Appl. No.: 13/731,064

(22) Filed: Dec. 30, 2012

Related U.S. Application Data

(60) Provisional application No. 61/606,918, filed on Mar. 5, 2012, provisional application No. 61/666,586, filed on Jun. 29, 2012.

(51) Int. Cl.
G06Q 10/10 (2012.01)
G06Q 30/02 (2012.01)
G06Q 10/06 (2012.01)
G06Q 30/06 (2012.01)
G06Q 10/08 (2012.01)

(52) U.S. Cl.
USPC .......................................... 705/1.1; 705/347

(58) Field of Classification Search
None
See application file for complete search history.

(56) References Cited

U.S. PATENT DOCUMENTS

| 5,956,693 | A | 9/1999 | Geerlings |
|---|---|---|---|
| 6,754,874 | B1 | 6/2004 | Richman |
| 7,130,777 | B2 | 10/2006 | Garg et al. |
| 7,519,562 | B1 | 4/2009 | Vander May et al. |
| 7,552,068 | B1 | 6/2009 | Brinkerhoff |
| 7,600,017 | B2 | 10/2009 | Holtzman et al. |
| 7,664,669 | B1 | 2/2010 | Adams et al. |
| 7,778,890 | B1 | 8/2010 | Bezos et al. |
| 7,779,360 | B1 | 8/2010 | Jones et al. |
| 7,809,602 | B2 | 10/2010 | Nickerson et al. |
| 7,813,986 | B2 | 10/2010 | Gardner et al. |
| 7,930,302 | B2 | 4/2011 | Bandaru et al. |
| 8,135,669 | B2 | 3/2012 | Olstad et al. |
| 8,170,958 | B1 | 5/2012 | Gremett et al. |
| 8,255,248 | B1 | 8/2012 | Del Favero et al. |
| 8,352,405 | B2 | 1/2013 | Fang et al. |
| 8,417,713 | B1 | 4/2013 | Blair-Goldensohn et al. |
| 8,498,990 | B2 | 7/2013 | Heber |
| 2002/0099598 | A1 | 7/2002 | Eicher et al. |
| 2003/0164849 | A1 | 9/2003 | Barrie et al. |
| 2003/0172014 | A1 | 9/2003 | Quackenbush et al. |
| 2003/0208388 | A1 | 11/2003 | Farkas et al. |

(Continued)

OTHER PUBLICATIONS

Jason Falls, "Venuelabs Unveils Klout-like Business Scores", http://www.socialmediaexplorer.com/digital-marketing/venuelabs-unveils-klout-like-business-scores, Nov. 14, 2011.

(Continued)

Primary Examiner — Jonathan Ouellette
(74) Attorney, Agent, or Firm — Van Pelt, Yi & James LLP

(57) ABSTRACT

A user is prompted to provide a review at a point of sale. Review data is received from the user. The review data is transmitted to a reputation platform configured to evaluate the received review data. If the review data indicates a positive review, a review request action is commenced. If the review data indicates a negative review, a remedial action is commenced.

19 Claims, 29 Drawing Sheets

(56) References Cited

U.S. PATENT DOCUMENTS

| | | |
|---|---|---|
| 2004/0032420 A1 | 2/2004 | Allen et al. |
| 2004/0153466 A1* | 8/2004 | Ziff et al. .................... 707/100 |
| 2005/0177457 A1 | 8/2005 | Shetlz et al. |
| 2005/0203795 A1 | 9/2005 | Witzenburg |
| 2006/0074920 A1 | 4/2006 | Wefers et al. |
| 2006/0123348 A1 | 6/2006 | Ross et al. |
| 2006/0242554 A1 | 10/2006 | Gerace et al. |
| 2006/0253584 A1 | 11/2006 | Dixon et al. |
| 2007/0027707 A1 | 2/2007 | Murray et al. |
| 2007/0078670 A1 | 4/2007 | Dave et al. |
| 2007/0136430 A1 | 6/2007 | Qureshi et al. |
| 2007/0192423 A1 | 8/2007 | Karlson |
| 2007/0294281 A1 | 12/2007 | Ward et al. |
| 2008/0033781 A1* | 2/2008 | Peretti ............................ 705/10 |
| 2008/0065472 A1 | 3/2008 | Patrick et al. |
| 2008/0071602 A1 | 3/2008 | Ojakaar et al. |
| 2008/0133488 A1 | 6/2008 | Bandaru et al. |
| 2008/0215589 A1 | 9/2008 | Elhaik |
| 2008/0306899 A1 | 12/2008 | Gregory et al. |
| 2009/0012828 A1 | 1/2009 | Brower et al. |
| 2009/0100005 A1 | 4/2009 | Guo et al. |
| 2009/0119258 A1 | 5/2009 | Petty |
| 2009/0119268 A1 | 5/2009 | Bandaru et al. |
| 2009/0157667 A1 | 6/2009 | Brougher et al. |
| 2009/0177691 A1 | 7/2009 | Manfredi et al. |
| 2009/0177988 A1 | 7/2009 | Martins |
| 2009/0193011 A1 | 7/2009 | Blair-Goldensohn et al. |
| 2009/0265251 A1 | 10/2009 | Dunlap et al. |
| 2009/0265332 A1 | 10/2009 | Mushtaq et al. |
| 2009/0281870 A1 | 11/2009 | Sun et al. |
| 2009/0282019 A1 | 11/2009 | Galitsky et al. |
| 2009/0319342 A1 | 12/2009 | Shilman et al. |
| 2010/0076968 A1 | 3/2010 | Boyns et al. |
| 2010/0121849 A1 | 5/2010 | Goeldi |
| 2010/0169317 A1 | 7/2010 | Wang et al. |
| 2010/0211308 A1 | 8/2010 | Zheng et al. |
| 2010/0257184 A1 | 10/2010 | Uy |
| 2010/0325107 A1 | 12/2010 | Kenton et al. |
| 2011/0047035 A1 | 2/2011 | Gidwani et al. |
| 2011/0099036 A1 | 4/2011 | Sarkissian et al. |
| 2011/0270705 A1 | 11/2011 | Parker |
| 2012/0066233 A1 | 3/2012 | Fonseka et al. |
| 2012/0130917 A1 | 5/2012 | Forsblom |
| 2012/0197816 A1 | 8/2012 | Short et al. |
| 2012/0197950 A1 | 8/2012 | Dayal et al. |
| 2012/0221479 A1 | 8/2012 | Schneck et al. |
| 2012/0226627 A1 | 9/2012 | Yang |
| 2012/0245924 A1 | 9/2012 | Brun |
| 2012/0260201 A1 | 10/2012 | Ganesh et al. |
| 2012/0260209 A1 | 10/2012 | Stibel et al. |
| 2012/0303419 A1 | 11/2012 | Yokoi et al. |
| 2012/0304027 A1 | 11/2012 | Stenfort |
| 2012/0323842 A1 | 12/2012 | Izhikevich et al. |

OTHER PUBLICATIONS

Lake, Laura, "Google Maps—Is Your Business Listed Accurately?", Sep. 1, 2009, <<http://marketing.about.com/b/2009/09101/google-maps-are-you-listed-accurately.htm>>, p. 3.

Logi DevNet, "Using Google Map Regions" <<http://devnet.logixml.com/rdPage.aspx?rdReport=Article&dnDocID=1055, May 1, 2009. p. 10.

Salz, Peggy Anne, "BooRah Takes Wraps Off New Service & Model; Is the Money in Mobile Search Syndication?", Jun. 10, 2008, <<http://www.mobilegroove.com/boorah-takes-wraps-off-new-service-is-the-money-in-mobile-search-syndication-940>>, p. 5.

Sarah Perez, "Venulabs is Launching VenueRank, A 'Klout for Storefronts'", http://techcrunch.com/2011/11/02/venuelabs-is-launching-venurank-a-klout-for-storefronts/, Nov. 2, 2011, p. 3.

Venuelabs Press Release, "Introducing VenueRank", http://venuelabs.com/introducing-venuerank/, Nov. 2, 2011.

Venuelabs, "Valuevine Launches Executive Dashboard for Multi-Location Businesses", http://venuelabs.com/valuevine-launches-location-analytics-product/, Feb. 15, 2011.

Chris Piepho, "Getting Your Business Reviewed", Jul. 1, 2010, blog on smallbusinessshift.com.

Mike Blumenthal, Selected Blogs on Reputation management, from http://blumenthals.com, Mar. 2010.

Kermit Pattison, "Managing an Online Reputation", NYTimes.com, Jul. 30, 2009.

Tull et al., "Marketing Management", Macmillan Publishing Company, New York, 1990, Chapter 15.

Lini S. Kabada, "Good-Rep Merchants Seek to Restore Your Online Image", Privacy Journal, 37.5 (Marcy 2011), 1-2, 7.

* cited by examiner

Location Summary

| Location ▲ | Manager | Average Rating | Total Reviews | Score |
|---|---|---|---|---|
| ALBUQUERQUE, NM (#105) | | 3.3 | 3 (2, 1, 0) | 135 |
| ALBUQUERQUE, NM (#1212) | | 5.0 | 1 (1, 0, 0) | 369 |
| ALBUQUERQUE, NM (#210) | | 2.0 | 4 (1, 3, 0) | 177 |
| ALBUQUERQUE, NM (#2210) | | | — | — |
| ALBUQUERQUE, NM (#3554) | | 1.0 | 1 (0, 1, 0) | 37 |
| ALBUQUERQUE, NM (#3900) | | 5.0 | 1 (1, 0, 0) | 371 |
| ALBUQUERQUE, NM (#4275) | | 2.0 | 1 (0, 1, 0) | 87 |
| ALBUQUERQUE, NM (#5654) | | | — | — |
| ALBUQUERQUE, NM (#751) | | 1.0 | 2 (0, 2, 0) | 54 |
| ALBUQUERQUE, NM (#937) | | 3.1 | 7 (4, 3, 0) | 333 |
| Aberdeen, SD (#4543) | | 4.0 | 1 (1, 0, 0) | 183 |
| Affton, MO (#5458) | | 5.0 | 2 (2, 0, 0) | 465 |
| Afton, IL (#4585) | | | — | — |
| Alhambra, CA (#5176) | | 5.0 | 1 (1, 0, 0) | 373 |
| Ames, IA (#5469) | | 1.0 | 1 (0, 1, 0) | 35 |

FIG. 16

Request Reviews

Use this form to request reviews from your customers.

To: [_____]
☐ Send a copy to myself
*Add multiple emails separated by a comma. Your customers will not see each others email addresses.*

From Location: [ALBUQUERQUE, NM (#3900) ▸]
From Email: [alice@acme.com]
From Name: [Alice Smith]

Templates: [Casual and not too slick ▸]  Reset to Template  Save as template

Subject: [Reviewing ALBUQUERQUE, NM (#3900)]

Review Sites: ☐ Insider Pages  ☐ Google Places
             ☐ Citysearch     ☐ Yahoo! Local

ACME

Alice Smith
Albuquerque, NM (#3900)
123 Main St.
Albuquerque, NM 87113

Hello,

Thanks for visiting ACME. We'd really like to know how you felt about your recent visit.

If you have the time, please consider writing us a review online!

...

Your opinion matters!
Please take a moment to review us on one of the following sites:
[Insider Pages]
[Superpages]  — 1804
[Yahoo Local]

---

ⓘ FAQs

Who should I send requests to?
Start with repeat customers and others who are in a position to say something substantial and meaningful. You want your reviews to say more than just "These guys are great!"

How many requests should I send at a time?
No more than 10. Reviews should appear slowly and naturally over time, not all in one big spurt.

How many review sites should I include in the email?
It's good to give some choice, but you don't want to overwhelm your customers either. Choose a few sites that are ranking most highly in your search results, and/or chose those that have less-than-perfect reviews.

Why not ask for a good review?
Customers don't like to feel manipulated. If you ask them for their honest opinions instead, they will be flattered that you trust them and more likely to write something positive.

How do I write an effective request?
Focus on your people and add personal details. Your customers will be more likely to review you positively if they see the people behind your business. Also, be yourself. Your customers know you, and want to see your personality come through in your email.

| REQUEST HISTORY | | | | | |
|---|---|---|---|---|---|
| Date ▼ | Site(s) | Recipients | Subject | Location | Response |
| 6/15/11 | Google Places | Joe@example.com<br>Nancy22@mail.com<br>FrankSmith@example.com<br><br>Show all 9 | How was your visit? | Store #2837<br>Flint, MI | 4/9 click-thrus<br>Detailed statistics |
| 6/12/11 | Google Places<br>Insider Pages | Ted@example.com<br>Jenny@mail.com | How was your visit? | Store #9573<br>Detroit, MI | 2/2 click-thrus<br>Detailed statistics |

FIG. 19

STIMULATING REVIEWS AT A POINT OF SALE

CROSS REFERENCE TO OTHER APPLICATIONS

This application claims priority to U.S. Provisional Patent Application No. 61/606,918 entitled BUSINESS REPUTATION SYSTEM filed Mar. 5, 2012 and U.S. Provisional Patent Application No. 61/666,586 entitled BUSINESS REPUTATION SYSTEM filed Jun. 29, 2012 both of which are incorporated herein by reference for all purposes.

BACKGROUND OF THE INVENTION

Businesses are increasingly concerned with their online reputations. For example, both positive and negative reviews posted to a review website can impact revenue. As more review websites are created, and as more users post more content to those sites, it is becoming increasingly difficult for businesses to monitor such sites. Further, it can be difficult for businesses to determine whether they need to, and how they can, improve their online reputations.

BRIEF DESCRIPTION OF THE DRAWINGS

Various embodiments of the invention are disclosed in the following detailed description and the accompanying drawings.

FIG. 16 illustrates a portion of an interface as rendered in a browser.

FIG. 18 illustrates a portion of an interface as rendered in a browser.

FIG. 19 illustrates a portion of an interface as rendered in a browser.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
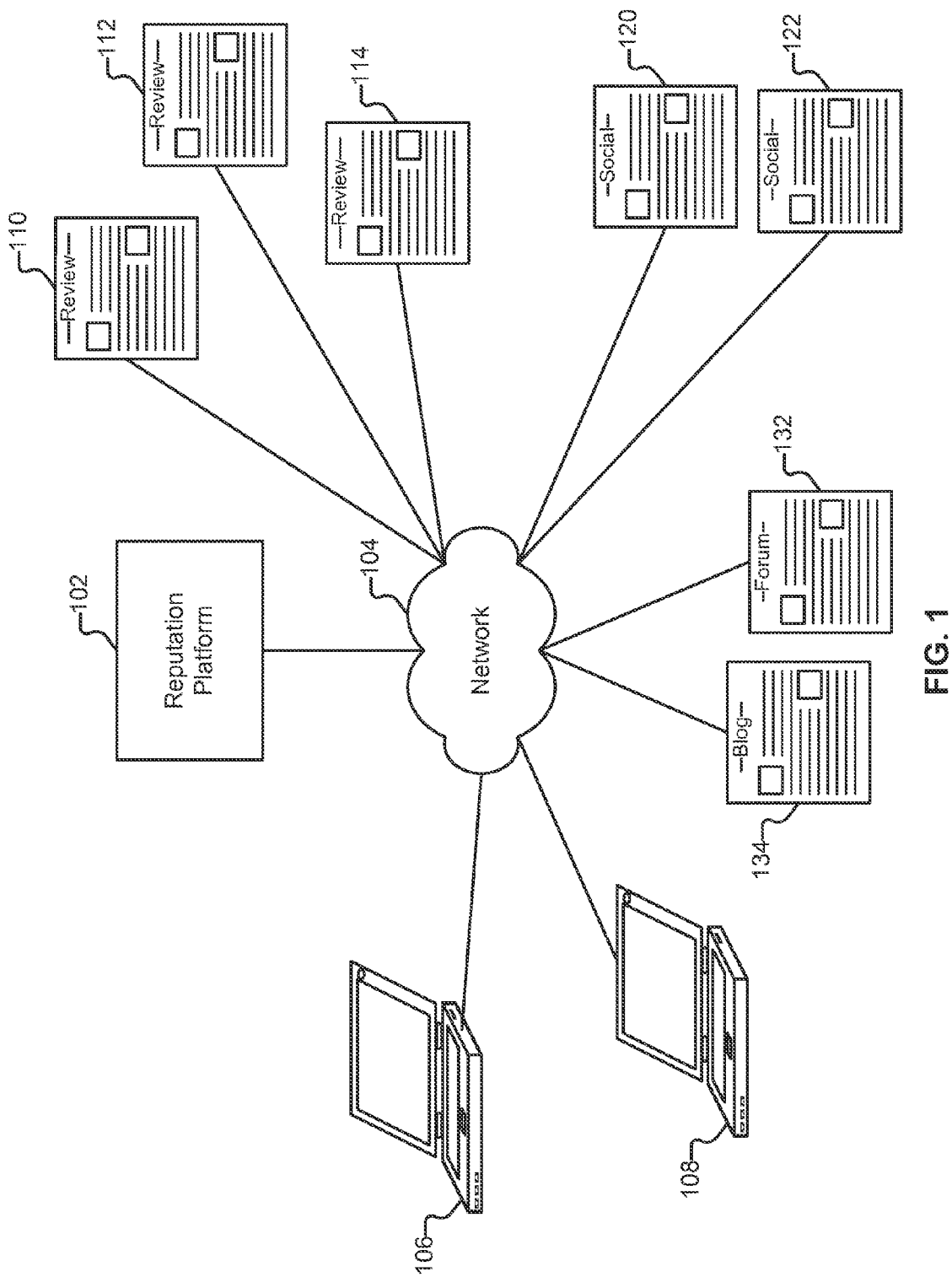
FIG. 1 illustrates an embodiment of an environment in which business reputation information is collected, analyzed, and presented.

FIG. 1 illustrates an embodiment of an environment in which business reputation information is collected, analyzed, and presented. In the example shown, the user of client device 106 (hereinafter referred to as "Bob") owns a single location juice bar ("Bob's Juice Company"). The user of client device 108 (hereinafter referred to as "Alice") is employed by a national chain of convenience stores ("ACME Convenience Stores"). As will be described in more detail below, Bob and Alice can each access the services of reputation platform 102 (via network 104) to track the reputations of their respective businesses online. The techniques described herein can work with a variety of client devices 106-108 including, but not limited to personal computers, tablet computers, and smartphones.

Reputation platform 102 is configured to collect reputation and other data from a variety of sources, including review websites 110-114, social networking websites 120-122, and other websites 132-134. In some embodiments, users of platform 102, such as Alice and Bob, can also provide offline survey data to platform 102. In the examples described herein, review site 110 is a general purpose review site that allows users to post reviews regarding all types of businesses. Examples of such review sites include Google Places, Yahoo! Local, and Citysearch. Review site 112 is a travel-oriented review site that allows users to post reviews of hotels, restaurants, and attractions. One example of a travel-oriented review site is TripAdvisor. Review site 114 is specific to a particular type of business (e.g., car dealers). Examples of social networking sites 120 and 122 include Twitter and Foursquare. Social networking sites 120-122 allow users to take actions such as "checking in" to locations. Finally, personal blog 134 and online forum 132 are examples of other types of websites "on the open Web" that can contain business reputation information.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task.

Account/Business Setup

Figure 2:
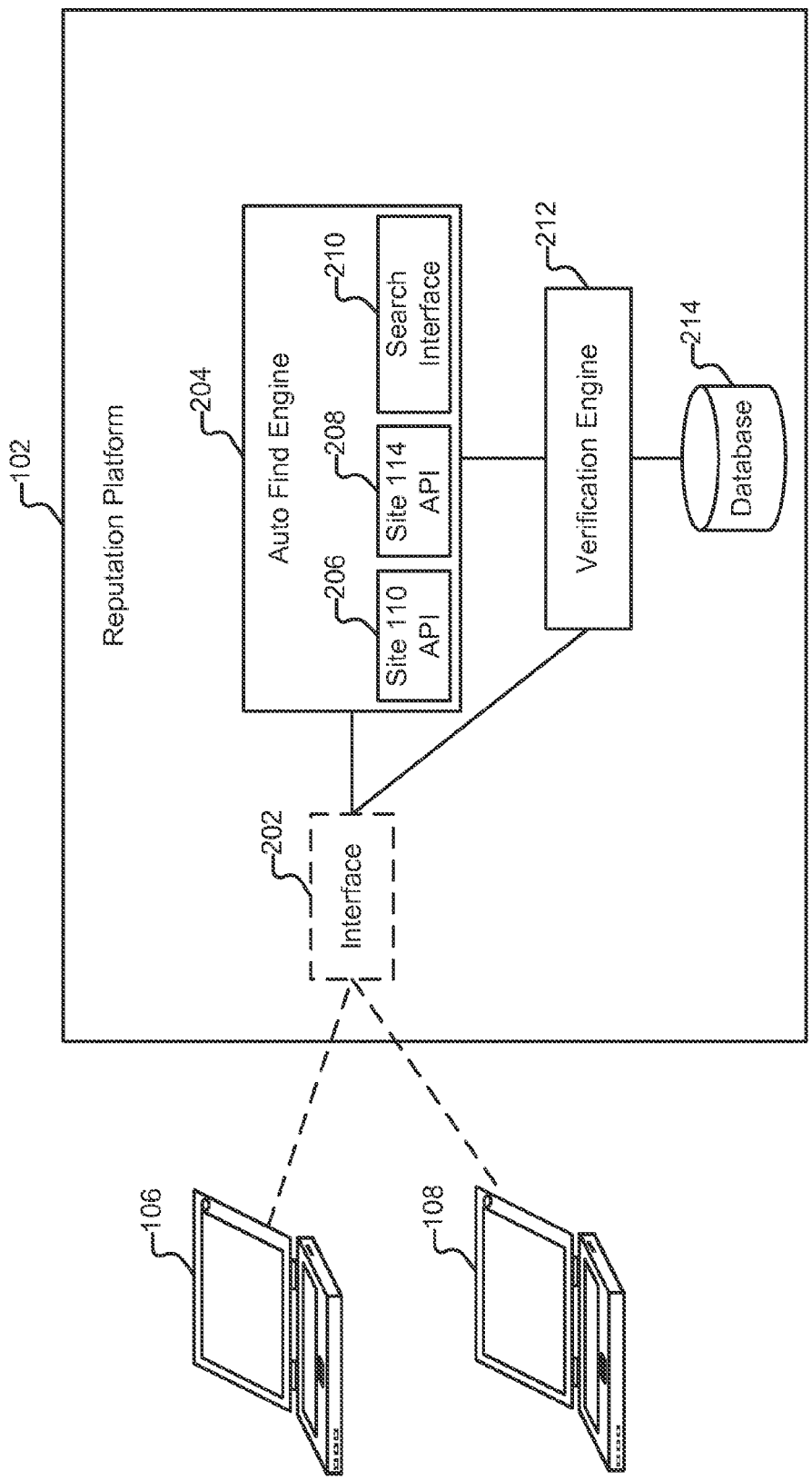
FIG. 2 illustrates an example of components included in embodiments of a reputation platform.

FIG. 2 illustrates an example of components included in embodiments of a reputation platform. In particular, FIG. 2 illustrates components of platform 102 that are used in conjunction with a business setup process.

In order to access the services provided by reputation platform 102, Bob first registers for an account with the platform. At the outset of the process, he accesses interface 202 (e.g., a web-based interface) and provides information such as a desired username and password. He also provides payment information (if applicable). If Bob has created accounts for his business on social networking sites such as sites 120 and 122, Bob can identify those accounts to platform 102 as well.

Next, Bob is prompted by platform 102 to provide the name of his business (e.g., "Bob's Juice Company"), a physical address of the juice bar (e.g., "123 N. Main St.; Cupertino, Calif. 95014), and the type of business that he owns (e.g., "restaurant" or "juice bar"). The business information entered by Bob is provided to auto find engine 204, which is configured to locate, across sites 110-114, the respective profiles on those sites pertaining to Bob's business (e.g., "www.examplereviewsite.com/CA/Cupertino/BobsJuiceCo.html"), if present. Since Bob has indicated that his business is a juice bar, reputation platform 102 will not attempt to locate it on site 114 (a car dealer review site), but will attempt to locate it within sites 110 and 112.

In the example shown in FIG. 2, sites 110 and 114 make available respective application programming interfaces (APIs) 206 and 208 that are usable by auto find engine 204 to locate business profiles on their sites. Site 112 does not have a profile finder API. In order to locate a business profile there, auto find engine 204 is configured to perform a site-specific search using a script that accesses a search engine (e.g., through search interface 210). As one example, a query of: "site:www.examplereviewsite.com 'Bob's Juice Company' Cupertino" could be submitted to the Google search engine using interface 210.

Results obtained by auto find engine 204 are provided to verification engine 212, which confirms that information, such as the physical address and company name provided by Bob are present in the located profiles. Verification engine 212 can be configured to verify all results (including any obtained from site 110 and 114), and can also be configured to verify (or otherwise process) just those results obtained via interface 210. As one example, for a given query, the first ten results obtained from search interface 210 can be examined. The result that has the best match score and also includes the expected business name and physical address is designated as the business's profile at the queried site.

In some embodiments, verification engine 212 presents results to Bob for verification that the located profiles correspond to his business. As one example, Bob may be shown (via interface 202) a set of URLs corresponding to profiles on each of the sites 110-114 where his business has been located and asked to verify that the profiles are indeed for his business. Once confirmed by Bob, the URLs of the profiles (also referred to herein as "subscriptions") and any other appropriate data are stored in database 214. Examples of such other data include overview information appearing on the business's profile page (such as a description of the business) and any social data (e.g., obtained from sites 120-122).

In various embodiments, users are given the option by platform 102 to enter the specific URLs corresponding to their business profiles on review sites. For example, if Bob knows the URL of the Google Places page corresponding to his business, he can provide it to platform 102 and use of auto find engine 204 is omitted (or reduced) as applicable.

Figure 3:
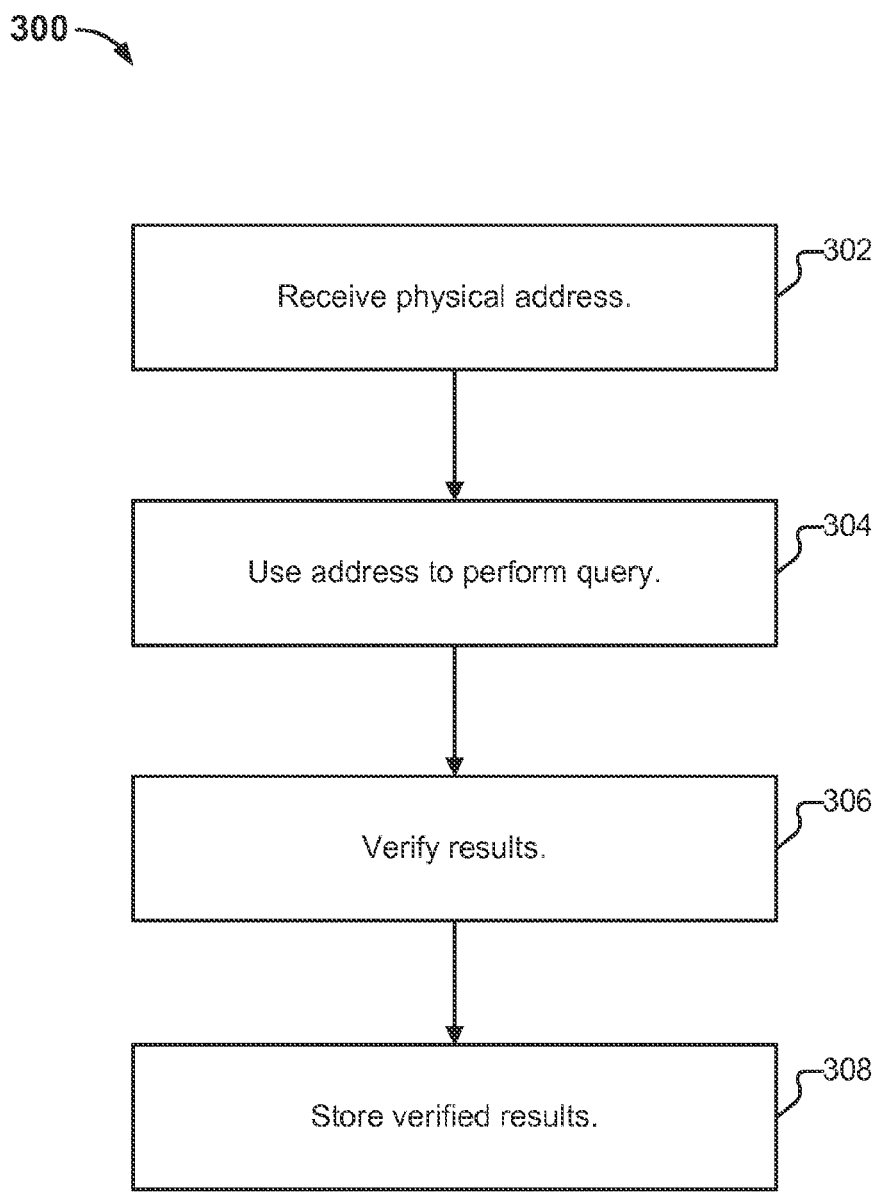
FIG. 3 illustrates an embodiment of a process for enrolling a business with a reputation platform.

FIG. 3 illustrates an embodiment of a process for enrolling a business with a reputation platform. In some embodiments process 300 is performed by platform 102. The process begins at 302 when a physical address of a business is received. As one example, when Bob provides the address of his business to platform 102 via interface 202, that address is received at 302. At 304, the received address is used as a query. As one example of the processing performed at 304, the received address is provided to site 110 using API 206. As another example, a site-specific query (e.g., of site 112) is submitted to a search engine via search interface 210.

At 306, results of the query (or queries) performed at 304 are verified. As one example of the processing performed at 304, verification engine 212 performs checks such as confirming that the physical address received at 302 is present in a given result. As another example, a user can be asked to confirm that results are correct, and if so, that confirmation is received as a verification at 306. Finally, at 308, verified results are stored. As one example, URLs for each of the verified profiles is stored in database 214. Although pictured as a single database in FIG. 2, in various embodiments, platform 102 makes use of multiple storage modules, such as multiple databases. Such storage modules may be of different types. For example, user account and payment information may be stored in a MySQL database, while extracted reputation information (described in more detail below) may be stored using MongoDB.

Where a business has multiple locations, the business owner (or a representative of the business, such as Alice) can be prompted to loop through process 300 for each of the business locations. Physical addresses and/or the URLs of the corresponding profiles on sites such as sites 110-114 can also be provided to platform 102 in a batch, rather than by manually entering in information via interface 202. As one example, suppose ACME Convenience Stores has 2,000 locations throughout the United States. Instead of manually entering in the physical location of each of the stores, Alice may instead elect to upload to platform 102 a spreadsheet or other file (or set of files) that includes the applicable information.

Tags associated with each location can also be provided to platform 102 (e.g., as name-value pairs). For example, Alice can tag each of the 2,000 locations with a respective store name (Store #1234), manager name (Tom Smith), region designation (West Coast), brand (ACME-Quick vs. Super-ACME), etc. As needed, tags can be edited and deleted, and new tags can be added. For example, Alice can manually edit a given location's tags (e.g., via interface 202) and can also upload a spreadsheet of current tags for all locations that supersede whatever tags are already present for her locations in platform 102. As will be described in more detail below, the tags can be used to segment the business to create custom reports and for other purposes.

Ongoing Data Collection and Processing

Figure 4:
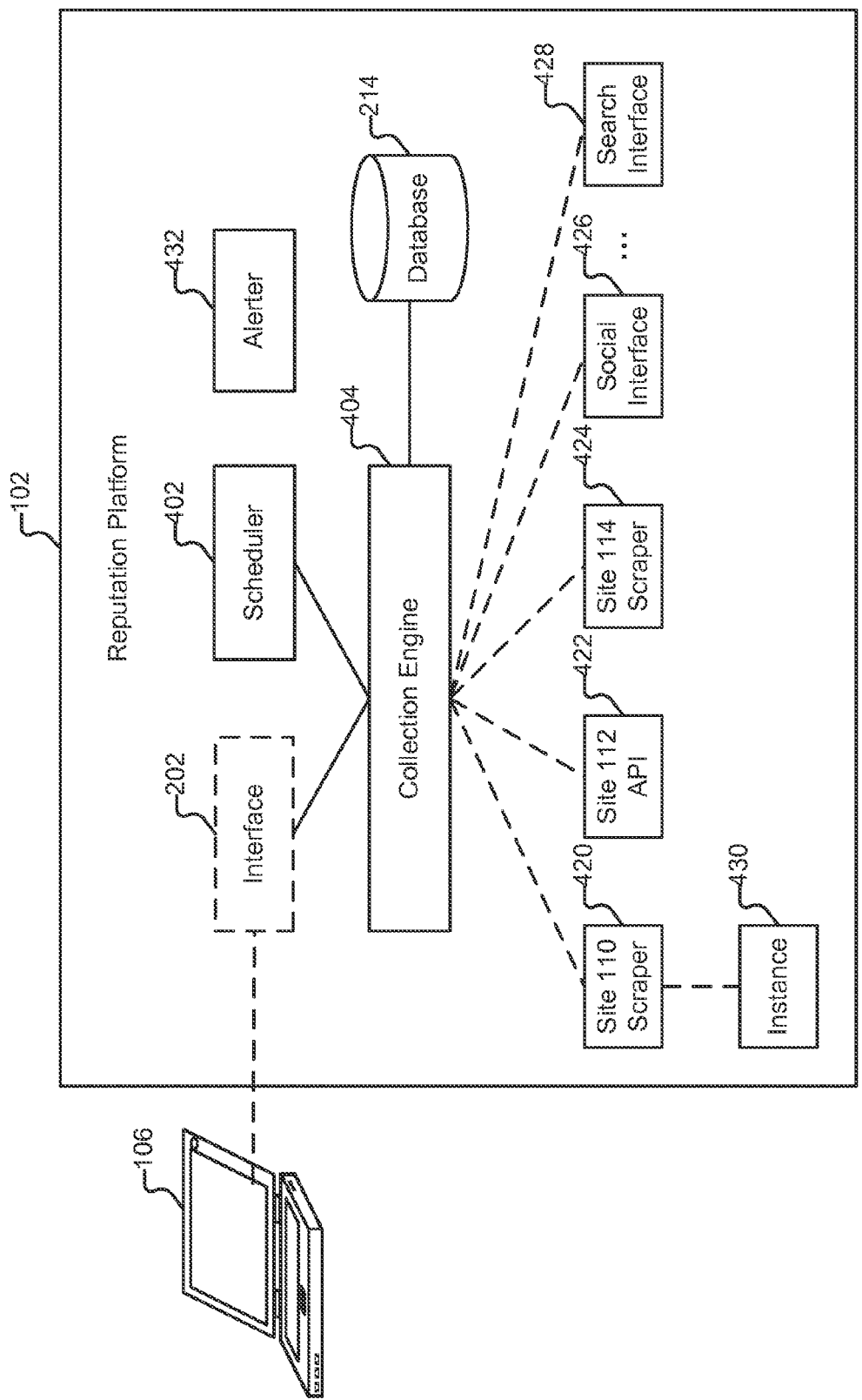
FIG. 4 illustrates an example of components included in embodiments of a reputation platform.

Once a business (e.g., Bob's Juice Company) has an account on reputation platform 102, and once the various subscriptions (i.e., the URLs of the business's profiles on the various review sites) have been identified and stored in database 214, collecting and processing of review and other data is performed. FIG. 4 illustrates an example of components included in embodiments of a reputation platform. In particular, FIG. 4 illustrates components of platform 102 that are used in conjunction with the ongoing collection and processing of data.

Reputation platform 102 includes a scheduler 402 that periodically instructs collection engine 404 to obtain data from sources such as sites 110-114. In some embodiments, data from sites 120-122, and/or 132-134 is also collected by collection engine 404. Scheduler 402 can be configured to initiate data collection based on a variety of rules. For example, it can cause data collection to occur once a day for all businesses across all applicable sites. It can also cause collection to occur with greater frequency for certain businesses (e.g., which pay for premium services) than others (e.g., which have free accounts). Further, collection can be performed across all sites (e.g., sites 110-114) with the same frequency or can be performed at different intervals (e.g., with collection performed on site 110 once per day and collection performed on site 112 once per week).

In addition to or instead of the scheduled collection of data, data collection can also be initiated based on the occurrence of an arbitrary triggering event. For example, collection can be triggered based on a login event by a user such as Bob (e.g., based on a permanent cookie or password being supplied). Collection can also be triggered based on an on-demand refresh request by the user (e.g., where Bob clicks on a "refresh my data" button in interface 202). Other elements depicted in FIG. 4 will be described in conjunction with process 500 shown in FIG. 5.

Figure 5:
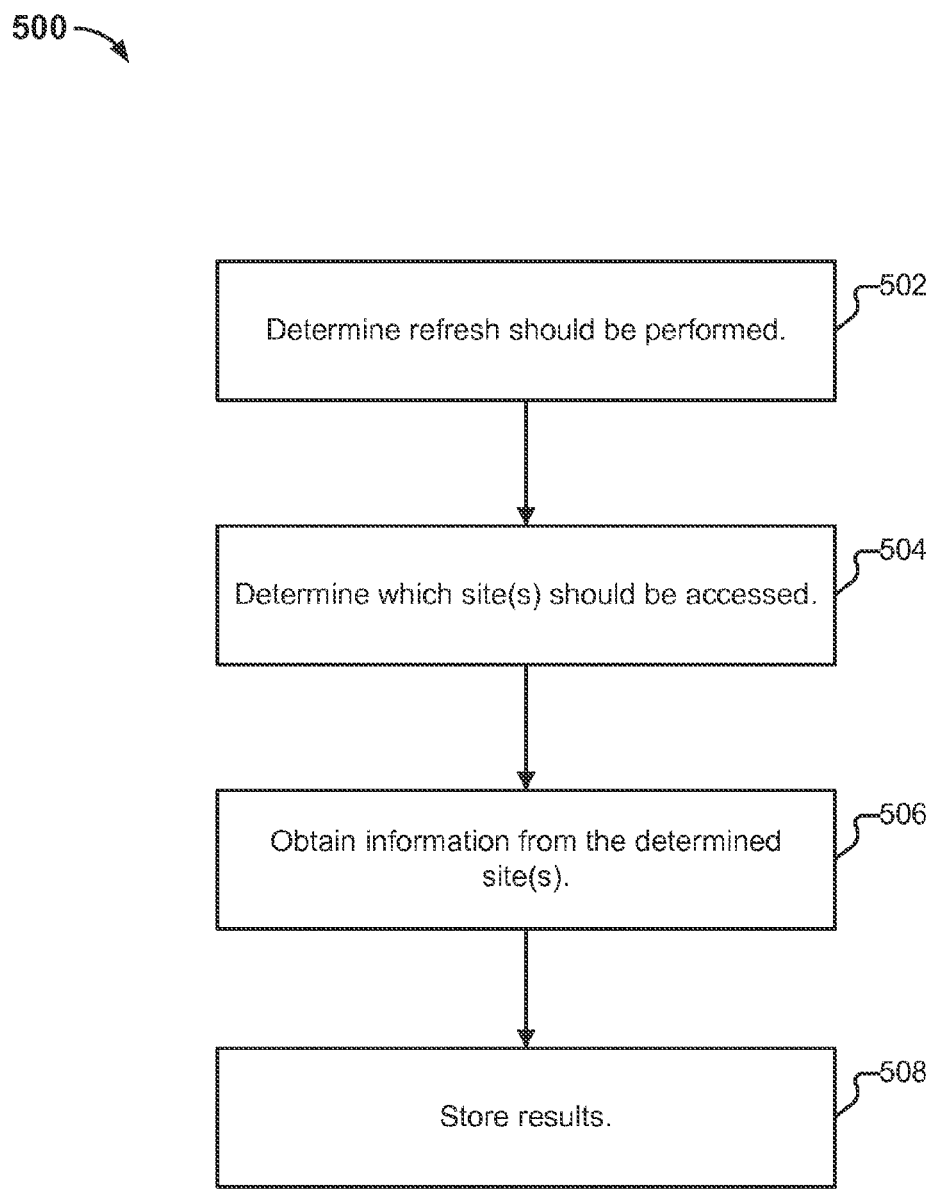
FIG. 5 illustrates an embodiment of a process for refreshing reputation data.

FIG. 5 illustrates an embodiment of a process for refreshing reputation data. In some embodiments process 500 is performed by platform 102. The process begins at 502 when a determination is made that a data refresh should be performed. As one example, such a determination is made at 502 by scheduler 402 based on an applicable schedule. As another example, such a determination is made at 502 when a triggering event (such as a login event by Bob) is received by platform 102.

At 504, a determination is made as to which sites should be accessed. As one example, in some embodiments collection engine 404 reviews the set of subscriptions stored in database 214 for Bob's Juice Company. The set of subscriptions associated with Bob's company are the ones that will be used by collection engine 404 during the refresh operation. As previously mentioned, a refresh can be performed on behalf of multiple (or all) businesses, instead of an individual one such as Bob's Juice Company. In such a scenario, portion 504 of the process can be omitted as applicable.

At 506, information is obtained from the sites determined at 504. As shown in FIG. 4, collection engine 404 makes use of several different types of helpers 420-428. Each helper (e.g., helper 420) is configured with instructions to fetch data from a particular type of source. As one example, although site 110 provides an API for locating business profiles, it does not make review data available via an API. Such data is instead scraped by platform 102 accordingly. In particular, when a determination is made that reviews associated with Bob's Juice Company on site 110 should be refreshed by platform 102, an instance 430 of helper 420 is executed on platform 102. Instance 430 is able to extract, for a given entry on site 110, various components such as: the reviewer's name, profile picture, review title, review text, and rating. Helper 424 is configured with instructions for scraping reviews from site 114. It is similarly able to extract the various components of an entry as posted to site 114. Site 112 has made available an API for obtaining review information and helper 422 is configured to use that API.

Other types of helpers can extract other types of data. As one example, helper 426 is configured to extract check-in data from social site 120 using an API provided by site 120. As yet another example, when an instance of helper 428 is executed on platform 102, a search is performed across the World Wide Web for blog, forum, or other pages that discuss Bob's Juice Company. In some embodiments, additional processing is performed on any results of such a search, such as sentiment analysis.

In various embodiments, information, obtained on behalf of a given business, is retrieved from different types of sites in accordance with different schedules. For example, while review site data might be collected hourly, or on demand, social data (collected from sites 120-122) may be collected once a day. Data may be collected from sites on the open Web (e.g., editorials, blogs, forums, and/or other sites not classified as review sites or social sites) once a week.

At 508, any new results (i.e., those not already present in database 214) are stored in database 214. As needed, the results are processed (e.g., by converting reviews into a single, canonical format) prior to being included in database 214. In various embodiments, database 214 supports heterogeneous records and such processing is omitted or modified as applicable. For example, suppose reviews posted to site 110 must include a score on a scale from one to ten, while reviews posted to site 112 must include a score on a scale from one to five. Database 214 can be configured to store both types of reviews. In some embodiments, the raw score of a review is stored in database 214, as is a converted score (e.g., in which all scores are converted to a scale of one to ten). As previously mentioned, in some embodiments, database 214 is implemented using MongoDB, which supports such heterogeneous record formats.

Prior to the first time process 500 is executed with respect to Bob's Juice Company, no review data is present in database 214. Portion 506 of the process is performed for each of the data sources applicable to Bob's business (via instances of the applicable helpers), and the collected data is stored at 508. On subsequent refreshes of data pertinent to Bob's company, only new/changed information is added to database 214. In various embodiments, alerter 432 is configured to alert Bob (e.g., via an email message) whenever process 500 (or a particular portion thereof) is performed with respect to his business. In some cases, alerts are only sent when new information is observed, and/or when reputation scores associated with Bob's business (described in more detail below) change, or change by more than a threshold amount.

Reputation Scoring

Platform 102 is configured to determine a variety of reputation scores on behalf of businesses such as Bob's Juice Company. In the case of multiple-location businesses, such as ACME, individual reputation scores are determined for each of the locations, and the scores of individual businesses can be aggregated in a variety of ways. As will be described in more detail below, the scores provide users with perspective on how their businesses are perceived online. Also as will be described in more detail below, users are able to explore the factors that contribute to their businesses' reputation scores by manipulating various interface controls, and they can also learn how to improve their scores. In the case of multi-location businesses, such as ACME, users can segment the locations in a variety of ways to gain additional insight.

Figure 6:
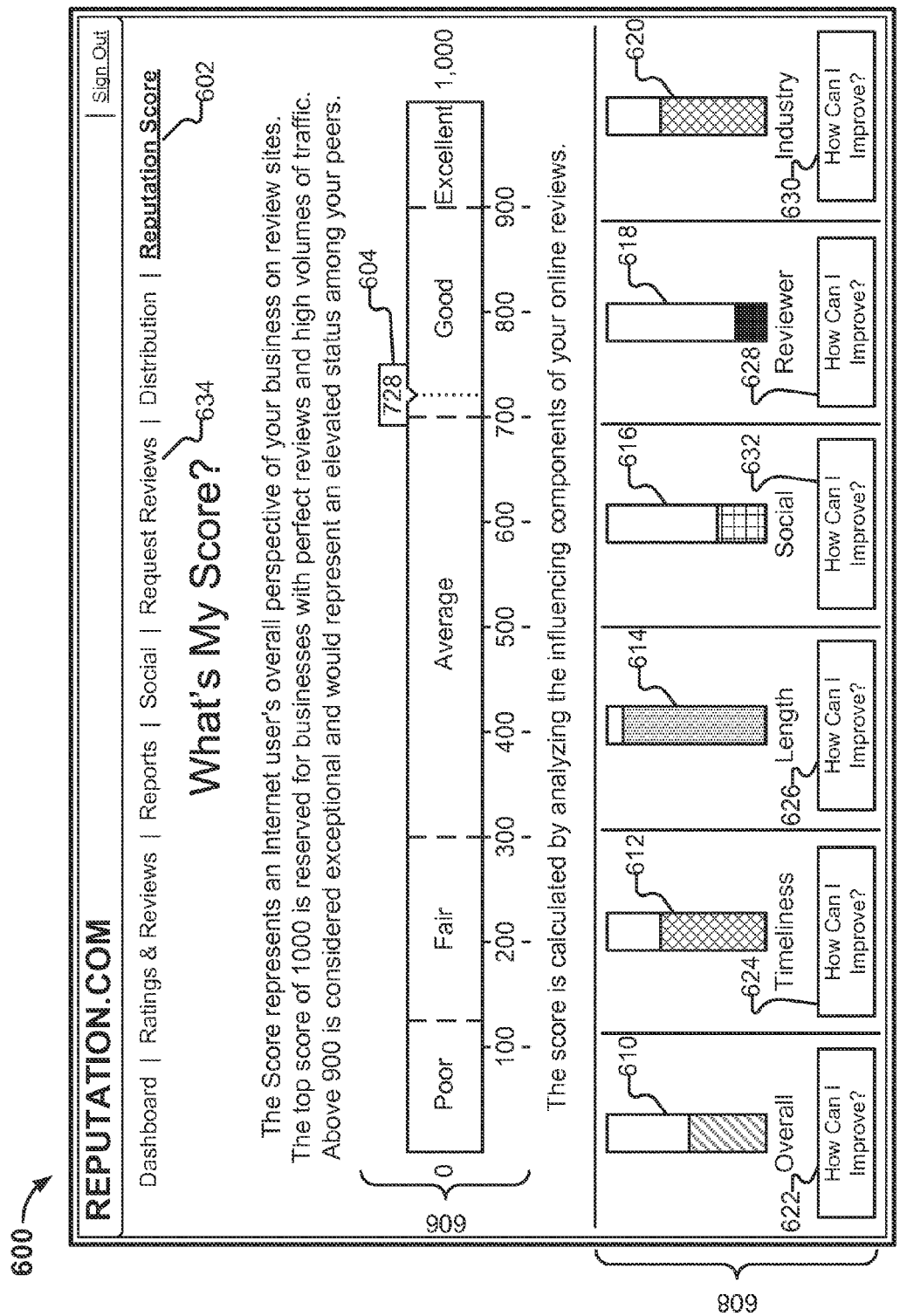
FIG. 6 illustrates an example of an interface as rendered in a browser.

FIG. 6 illustrates an example of an interface as rendered in a browser. In particular, Bob is presented with interface 600 after logging in to his account on platform 102 using a browser application on client device 106 and clicking on tab option 602.

In region 604 of interface 600, a composite reputation score (728 points) is depicted on a scale 606. Example ways of computing a composite score are described in conjunction with FIG. 7. The composite reputation score provides Bob with a quick perspective on how Bob's Juice Company is perceived online. A variety of factors can be considered in determining a composite score. Six example factors are shown in region 608, each of which is discussed below. For each factor, Bob can see tips on how to improve his score with respect to that factor by clicking on the appropriate box (e.g., box 622 for tips on improving score 610). In the example shown in FIG. 6, a recommendation box is present for each score presented in region 608. In some embodiments, such boxes are only displayed for scores that can/should be improved. For example, given that score 614 is already very high, in some embodiments, box 626 is omitted from the interface as displayed to Bob, or an alternate message is displayed, such as a general encouragement to "keep up the good work."

Overall Score (610): This value reflects the average review score (e.g., star rating) across all reviews on all review sites. As shown, Bob's business has an average rating of 0.50 across all sites. If Bob clicks on box 622, he will be presented with a suggestion, such as the following: "Overall score is the most influential metric. It can appear in both the review site search results and in your general search engine results. Generating a larger volume of positive reviews is the best way to improve the overall score. Typically, volume is the best approach as your average, happy customer will not write a review without being asked." Additional, personalized advice may also be provided, such as telling Bob he should click on tab 634 and request five reviews.

Timeliness (612): This score indicates how current a business's reviews are (irrespective of whether they are positive or negative). In the example shown, reviews older than two months have less of an impact than more recent reviews. Thus, if one entity has 200 reviews with an average rating of four stars, at least some of which were recently authored, and a second entity has the same volume and star rating but none of the reviews were written in the last two months, the first entity will have a higher timeliness score and thus a higher composite reputation score. If Bob clicks on box 624, he will be presented with a suggestion, such as the following: "Managing your online reviews is not a one-time exercise, but a continual investment into your business. Encourage a steady trickle of new reviews on a regular basis to ensure that your reviews don't become stale." Other measures of Timeliness can also be used, such as a score that indicates the relative amount of new vs. old positive reviews and new vs. old negative reviews. (I.e., to see whether positive or negative reviews dominate in time.)

Length (614): This score indicates the average length of a business's reviews. Longer reviews add weight to the review's rating. If two reviews have the same star rating (e.g., one out of five stars), but the first review is ten words and the second review is 300 words, the second review will be weighted more when computing the composite score. If Bob clicks on box 626, he will be presented with a suggestion, such as the following: "Encourage your positive reviewers to write in-depth reviews. They should detail their experiences and highlight what they like about your business. This provides credibility and the guidance makes review writing easier for them." Other measures of Length can also be used, such as a score that indicates the relative amount of long vs. short positive reviews and long vs. short negative reviews. (I.e., to see whether positive or negative reviews dominate in length.)

Social Factors (616): Reviews that have been marked with social indicators (e.g., they have been marked by other members of the review community as being "helpful" or "funny") will have more bearing on the outcome of the composite score. By clicking on box 632, Bob will be presented with an appropriate suggestion for improvement.

Reviewer Authority (618): A review written by an established member of a community (e.g., who has authored numerous reviews) will have a greater impact on the outcome of the composite score than one written by a reviewer with little or no history on a particular review site. In some embodiments, the audience of the reviewer is also taken into consideration. For example, if the reviewer has a large Twitter following, his or her review will have a greater bearing on the outcome of the score. If Bob clicks on box 628, he will be presented with a suggestion, such as the following: "Established reviewers can be a major boon to your review page. Their reviews are rarely questioned and their opinions carry significant weight. If you know that one of your customers is an active reviewer on a review site, make a special effort to get him or her to review your business."

Industry (620): Review sites that are directly related to the vertical in which the entity being reviewed resides are given more weight. For example, if the entity being reviewed is a car dealership and the review site caters specifically to reviews about car dealerships, the reviews in that specific site will have a greater impact on the outcome of the composite score than those on vertically ambiguous websites. If Bob clicks on box 630, he will be presented with a suggestion, such as the following: "The most important review sites for your business should have your best reviews. Monitor your website analytics to find the sites having the biggest impact on your business, and reinforce your presence on those sites."

In various embodiments of interface 600, additional controls for interactions are made available. For example, a control can be provided that allows a user to see individual outlier reviews—reviews that contributed the most to/deviated the most from the overall score (and/or individual factors). As one example, a one-star review that is weighted heavily in the calculation of a score or scores can be surfaced to the user. The user could then attempt to resolve the negative feelings of the individual that wrote the one-star review by contacting the individual. As another example, a particularly important five-star review (e.g., due to being written by a person with a very high reviewer authority score) can be surfaced to the user, allowing the user to contact the reviewer and thank him or her. As yet another example, if an otherwise influential review is stale (and positive), the review can be surfaced to the user so that the user can ask the author to provide an update or otherwise refresh the review.

A variety of weights can be assigned to the above factors when generating the composite score shown in region 604. Further, the factors described above need not all be employed nor need they be employed in the manners described herein. Additional factors can also be used when generating a composite score. An example computation of a composite score is discussed in conjunction with FIG. 7.

Example Score Generation

Figure 7:
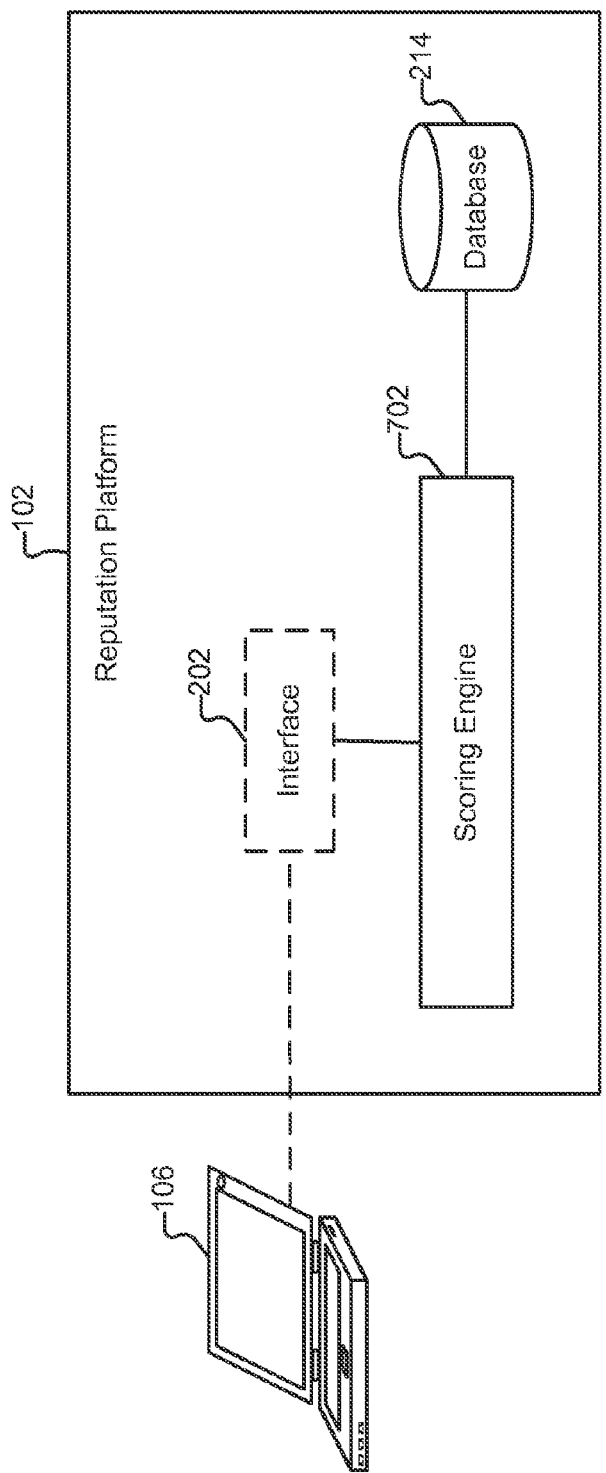
FIG. 7 illustrates an example of components included in an embodiment of a reputation platform.

FIG. 7 illustrates an example of components included in an embodiment of a reputation platform. In particular, FIG. 7 illustrates components of platform 102 that are used in conjunction with generating reputation scores.

In some embodiments, whenever Bob accesses platform 102 (and/or based on the elapsing of a certain amount of time), the composite score shown at 604 in FIG. 6 is refreshed. In particular, scoring engine 702 retrieves, from database 214, review and other data pertaining to Bob's business and generates the various scores shown in FIG. 6. Example ways of computing a composite reputation score are as follows.

(1) Base Score

First, scoring engine 702 computes a base score "B" that is a weighted average of all of the star ratings of all of the individual reviews on all of the sites deemed relevant to Bob's business:

$$B = 100 \cdot \frac{\sum_{i}^{N_r} s_i w_i}{\sum_{i}^{N_r} w_i} \cdot \Theta(N_r - N_{min})$$

where "$N_r$" is the total number of reviews, "$s_i$" is the number of "stars" for review "i" normalized to 10, "$w_i$" is the weight for review "i," $\Theta$ is the Heaviside step function, and "$N_{min}$" is the minimum number of reviews needed to score (e.g., 4). The factor 100 is used to expand the score to a value from 0 to 1000.

One example of the function "$w_i$" is as follows:

$$w_i = D_A \cdot T_i \cdot P_i \cdot R_A \cdot S_F \cdot L_F$$

In the above, "$D_A$" is the domain authority, which reflects how important the domain is with respect to the business. As one example, a doctor-focused review site may be a better authority for reviews of doctors than a general purpose review site. One way to determine domain authority values is to use the domain's search engine results page placement using the business name as the keyword.

"$R_A$" is the reviewer authority. One way to determine reviewer authority is to take the logarithm of 1+ the number of reviews written by the reviewer. As explained above, a review written by an individual who has authored many reviews is weighted more than one written by a less prolific user.

"$S_F$" is the social feedback factor. One way to determine the factor is to use the logarithm of 1+the number of pieces of social feedback a review has received.

"$L_F$" is the length factor. One way to specify this value is to use 1 for short reviews, 2 for medium reviews, and 4 for long reviews.

"$T_i$" is the age factor. One way to specify this factor is through the following: If the age is less than two months $T_i=1$, if the age "a," (in months)>2 months, then the following value is used:

$$T_i = \max(e^{-\omega \cdot (a_i - 2)}, 0.5)$$

where $\omega$ is the time-based decay rate.

"$P_i$" is the position factor for review "i." The position factor indicates where a given review is positioned among other reviews of the business (e.g., it is at the top on the first page of results, or it is on the tenth page). One way to compute the position factor is as follows:

$$P_i = e^{-\frac{p_i}{\lambda}}$$

where $\lambda$ is the positional decay length.

In some cases, a given site (e.g., site 110) may have an overall rating given for the business on the main profile page for that business on the site. In some embodiments, the provided overall rating is treated as an additional review with age $a=a_0$ and position $p=p_0$ and given an additional weight factor of 2.

(2) Normalization

Once the base score has been computed, it is normalized (to generate "$B_{norm}$"). In some embodiments this is performed by linearly stretching out the range of scores from 8 to 10 to 5 to 10 and linearly squeezing the range of scores from 0 to 8 to 0 to 5.

Optional Correction Factors

In some embodiments, a correction factor "C" is used for the number of reviews in a given vertical and locale:

$$C = a + b \cdot \frac{2}{\pi} \tan^{-1}\left(\frac{2 \cdot N_r}{\overline{N_r}}\right)$$

where "$N_r$" is the number of reviews for the business and the median number of reviews is taken for the business's vertical and locale. An example value for "a" is 0.3 and an example value for "b" is 0.7.

One alternate version of correction factor "C" is as follows:

$$C = a + b \cdot \frac{2}{\pi} \tan^{-1}\left(\frac{2 \cdot N_r}{\min(\max \overline{N_r}, N_{min}), N_{max})}\right)$$

where and "$N_{min}$" are the limits put on the comparator "$N_{max}$" in the denominator of the argument of the arctan in the correction factor. An example value for is 4 and an example value for "$N_{max}$" is 20.

A randomization correction "R" can also be used:

$$R = \min\left(1000, C \cdot B_{norm} + \frac{\mod(uid, 40) - 20}{N_r}\right)$$

where "C" is a correction factor (e.g., one of the two discussed above), "$B_{norm}$" is the normalized base score discussed above, and "uid" is a unique identifier assigned to the business by platform 102 and stored in database 214. The randomization correction can be used where only a small number of reviews are present for a given business.

Another example of "R" is as follows:

$$R = \max(0, C \cdot B_{norm} - 37.5 \cdot e^{-0.6 \cdot \alpha})$$

where "α" is the age of the most recent review.

Additional Examples of Scoring Embodiments

As explained above, a variety of techniques can be used by scoring engine 702 in determining reputation scores. In some embodiments, scores for all types of businesses are computed using the same sets of rules. In other embodiments, reputation score computation varies based on industry (e.g., reputation scores for car dealers using one approach and/or one set of factors, and reputation scores for doctors using a different approach and/or different set of factors). Scoring engine 702 can be configured to use a best in class entity when determining appropriate thresholds/values for entities within a given industry. The following are yet more examples of factors that can be used in generating reputation scores.

Review Volume:

The volume of reviews across all review sites can be used as a factor. For example, if the average star rating and the number of reviews are high, a conclusion can be reached that the average star rating is more accurate than where an entity has the same average star rating and a lower number of reviews. The star rating will carry more weight in the score if the volume is above a certain threshold. In some embodiments, thresholds vary by industry. Further, review volume can use more than just a threshold. For example, an asymptotic function of number of reviews, industry, and geolocation of the business can be used as an additional scoring factor.

Multimedia:

Reviews that have multimedia associated with them (e.g., a video review, or a photograph) can be weighted differently. In some embodiments, instead of using a separate multimedia factor, the length score of the review is increased (e.g., to the maximum value) when multimedia is present.

Review Distribution:

The population of reviews on different sites can be examined, and where a review distribution strays from the mean distribution, the score can be impacted. As one example, if the review distribution is sufficiently outside the expected distribution for a given industry, this may indicate that the business is engaged in gaming behavior. The score can be discounted (e.g., by 25%) accordingly. An example of advice for improving a score based on this factor would be to point out to the user that their distribution of reviews (e.g., 200 on site 110 and only 2 on site 112) deviates from what is expected in the user's industry, and suggest that the user encourage those who posted reviews to site 110 do so on site 112 as well.

Text Analysis:

Text analysis can be used to extract features used in the score. For example, reviews containing certain key terms (e.g., "visited" or "purchased") can be weighted differently than those that do not.

Figure 8:
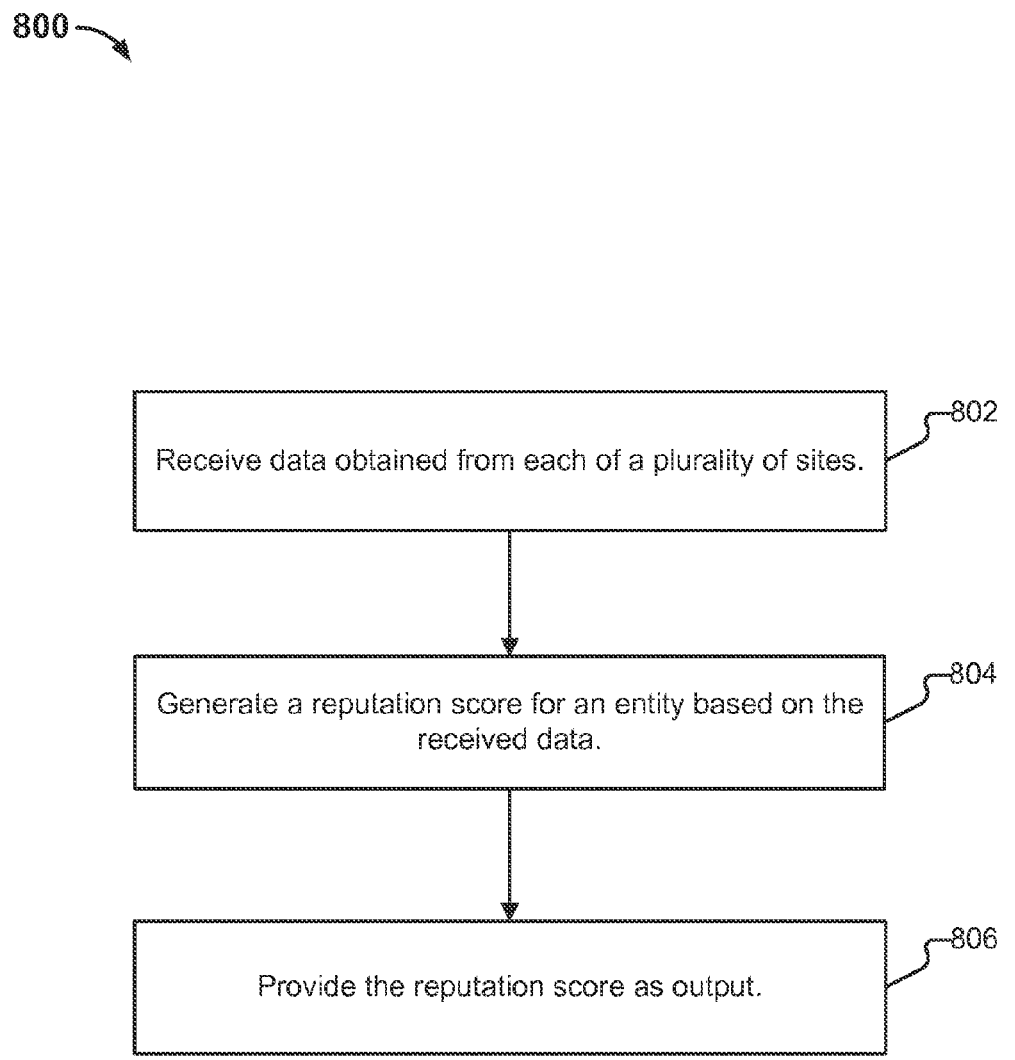
FIG. 8 illustrates an embodiment of a process for generating a reputation score.

FIG. 8 illustrates an embodiment of a process for generating a reputation score. In some embodiments, process 800 is performed by platform 102. The process begins at 802 when data obtained from each of a plurality of sites is received. As one example, process 800 begins at 802 when Bob logs into platform 102 and, in response, scoring engine 702 retrieves data associated with Bob's business from database 214. In addition to generating reputation scores on demand, scores can also be generated as part of a batch process. As one example, scores across an entire industry can be generated (e.g., for benchmark purposes) once a week. In such situations, the process begins at 802 when the designated time to perform the batch process occurs and data is received from database 214. In various embodiments, at least some of the data received at 802 is obtained on-demand directly from the source sites (instead of or in addition to being received from a storage, such as database 214).

At 804, a reputation score for an entity is generated. Various techniques for generating reputation scores are discussed above. Other approaches can also be used, such as by determining an average score for each of the plurality of sites and combining those average scores (e.g., by multiplying or adding them and normalizing the result). As mentioned above, in some embodiments the entity for which the score is generated is a single business (e.g., Bob's Juice Company). The score generated at 804 can also be determined as an aggregate across multiple locations (e.g., in the case of ACME Convenience Stores) and can also be generated across multiple businesses (e.g., reputation score for the airline industry), and/or across all reviews hosted by a site (e.g., reputation score for all businesses with profiles on site 110). One way to generate a score for multiple locations (and/or multiple businesses) is to apply scoring techniques described in conjunction with FIG. 7 using as input the pool of reviews that correspond to the multiple locations/businesses. Another way to generate a multi-location and/or multi-business reputation score is to determine reputation scores for each of the individual locations (and/or businesses) and then combine the individual scores (e.g., through addition, multiplication, or other appropriate combination function).

Finally, at 806 the reputation score is provided as output. As one example, a reputation score is provided as output in region 604 of interface 600. As another example, scoring engine 702 can be configured to send reputation scores to users via email (e.g., via alerter 432).

Enterprise Reputation Information

As explained above, in addition to providing reputation information for single location businesses, such as Bob's Juice Company, platform 102 can also provide reputation information for multi-location businesses (also referred to herein as "enterprises"). Examples of enterprises include franchises, chain stores, and any other type of multi-location business. The following section describes various ways that enterprise reputation information is made available by platform 102 to users, such as Alice, who represent such enterprises.

Figure 9:
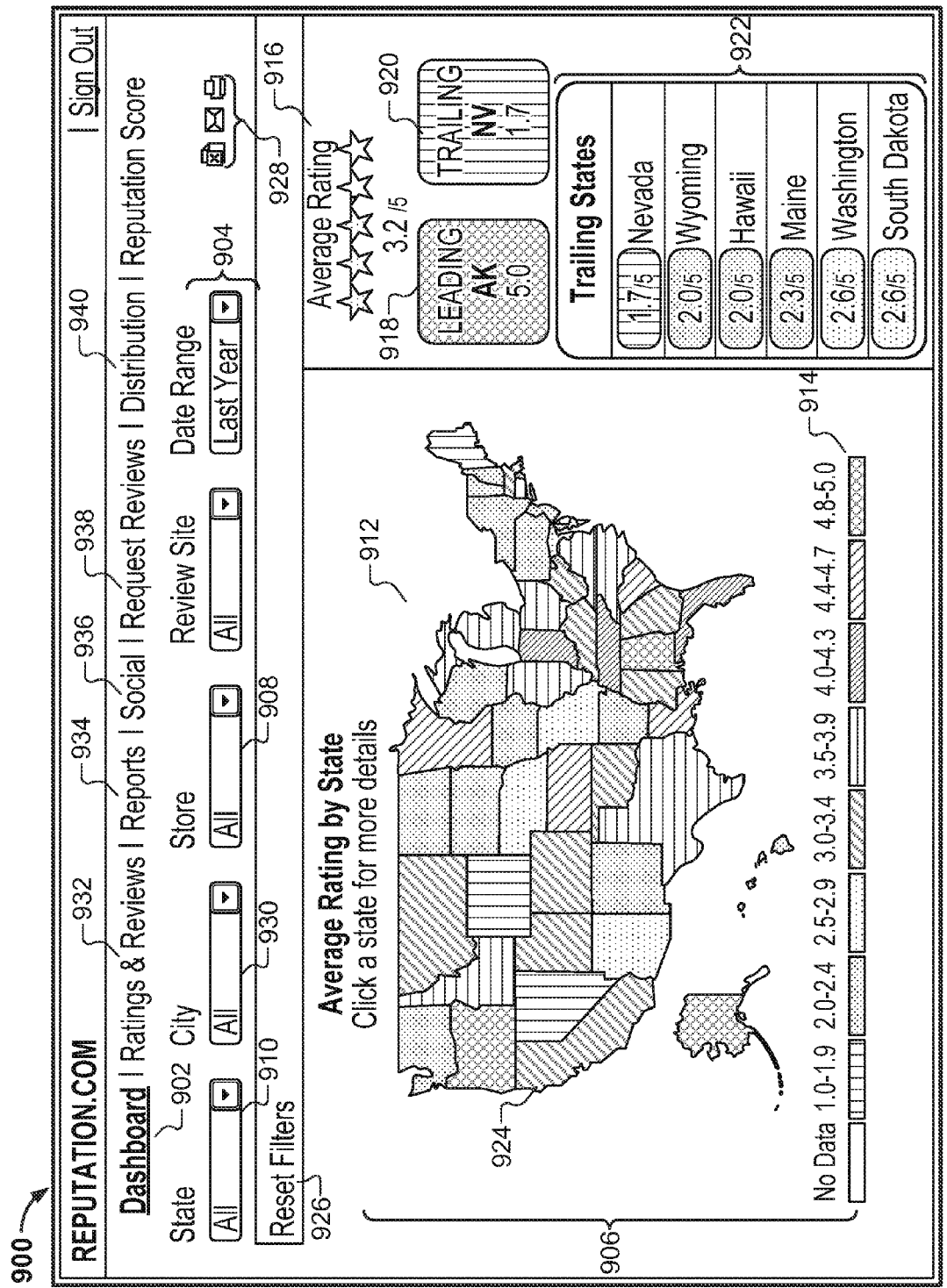
FIG. 9 illustrates an example of an interface as rendered in a browser.

FIG. 9 illustrates an example of an interface as rendered in a browser. In particular, Alice is presented with interface 900 after logging in to her account on platform 102 using a browser application on client 108. Alice can also reach interface 900 by clicking on tab option 902. By default, Alice is presented in region 912 with a map of the United States that highlights the average performance of all ACME locations within all states. In various embodiments, other maps are used. For example, if an enterprise only has stores in a particular state or particular county, a map of that state or county can be used as the default map. As another example, a multi-country map can be shown as the default for global enterprises. Legend 914 indicates the relationship between state color and the aggregate performance of locations in that states. Controls 928 allow Alice to take actions such as specifying a distribution list, printing the map, and exporting a CSV file that includes the ratings/reviews that power the display.

Presented in region 916 is the average reputation score across all 2,000 ACME stores. Region 918 indicates that ACME stores in Alaska have the highest average reputation score, while region 920 indicates that ACME stores in Nevada have the lowest average reputation score. A list of the six states in which ACME has the lowest average reputation scores is presented in region 922, along with the respective reputation scores of ACME in those states. The reputation scores depicted in interface 900 can be determined in a variety of ways, including by using the techniques described above.

The data that powers the map can be filtered using the dropdown boxes shown in region 904. The view depicted in region 906 will change based on the filters applied. And, the scores and other information presented in regions 916-922 will refresh to correspond to the filtered locations/time ranges. As shown, Alice is electing to view a summary of all review data (authored in the last year), across all ACME locations. Alice can refine the data presented by selecting one or more additional filters (e.g., limiting the data shown to just those locations in California, or to just those reviews obtained from site 110 that pertain to Nevada locations). The filter options presented are driven by the data, meaning that only valid values will be shown. For example, if ACME does not have any stores in Wyoming, Wyoming will not be shown in dropdown 910. As another example, once Alice selects "California" from dropdown 910, only Californian cities will be available in dropdown 930. To revert back to the default view, Alice can click on "Reset Filters" (926).

Some of the filters available to Alice (e.g., 908) make use of the tags that she previously uploaded (e.g., during account setup). Other filters (e.g., 910) are automatically provided by platform 102. In various embodiments, which filters are shown in region 904 are customizable. For example, suppose ACME organizes its stores in accordance with "Regions" and "Zones" and that Alice labeled each ACME location with its appropriate Region/Zone information during account setup. Through an administrative interface, Alice can specify that dropdowns for selecting "Region" and "Zone" should be included in region 904. As another example, Alice can opt to have store manager or other manager designations available as a dropdown filter. Optionally, Alice could also choose to hide certain dropdowns using the administrative interface.

Figure 10:
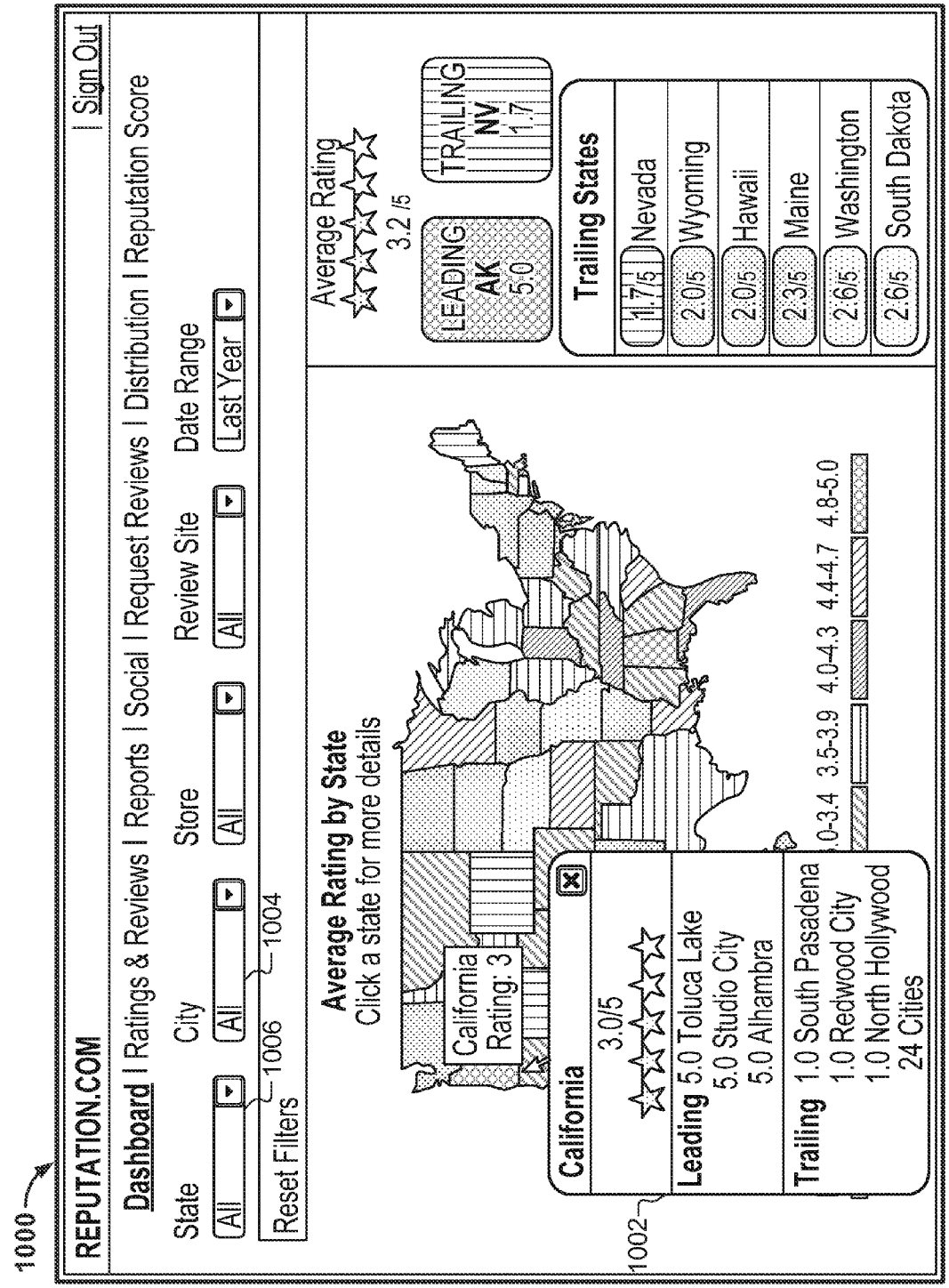
FIG. 10 illustrates an example of an interface as rendered in a browser.

Suppose Alice would like to learn more about the reputation of ACME's California stores. She hovers (or clicks) her mouse on region 924 of the map and interface 900 updates into interface 1000 as illustrated in FIG. 10, which includes a more detailed view for the state. In particular, pop-up 1002 is presented and indicates that across all of ACME's California stores, the average reputation score is 3. Further, out of the 24 California cities in which ACME has stores, the stores in Toluca Lake, Studio City, and Alhambra have the highest average reputation scores, while the stores in South Pasadena, Redwood City, and North Hollywood have the lowest average reputation scores. Alice can segment the data shown in interface 1000 by selecting California from dropdown 1006 and one or more individual cities from dropdown 1004 (e.g., to show just the data associated with stores in Redwood City).

Figure 11:
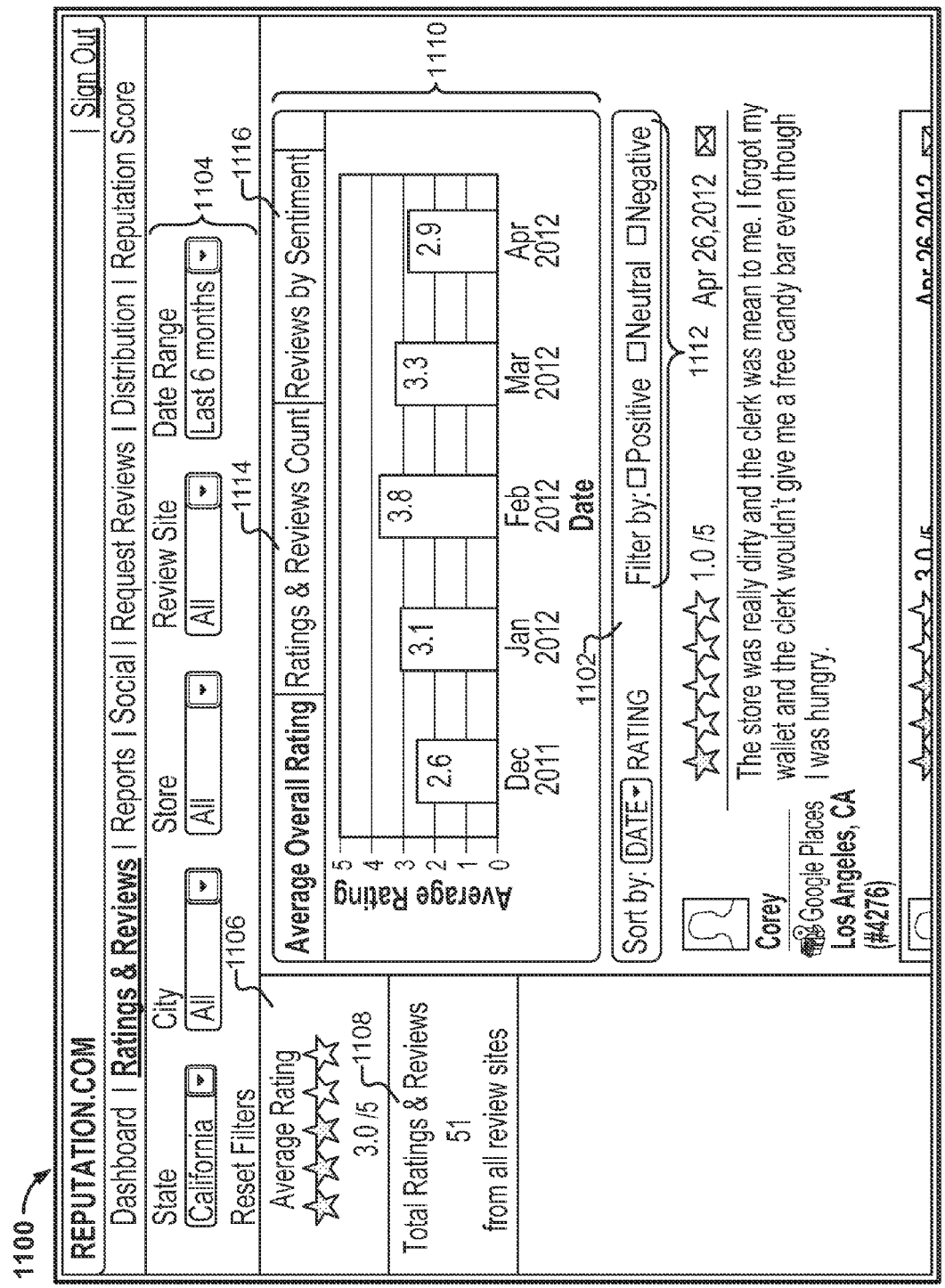
FIG. 11 illustrates an example of an interface as rendered in a browser.
Figure 12:
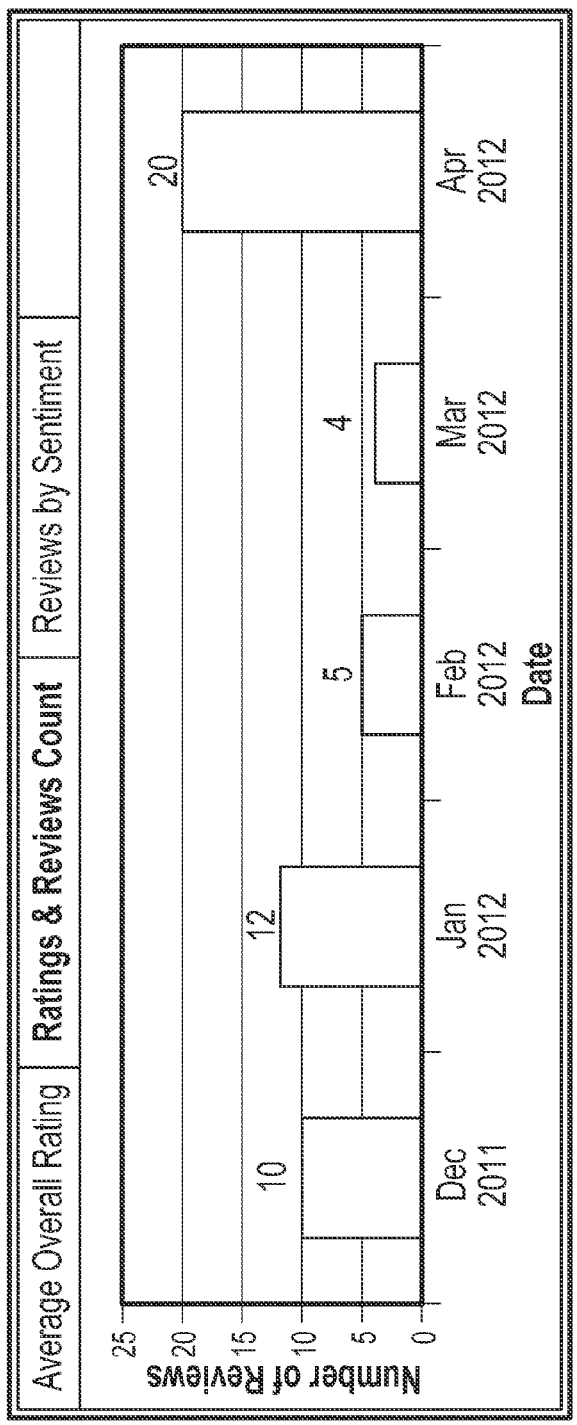
FIG. 12 illustrates a portion of an interface as rendered in a browser.
Figure 13:
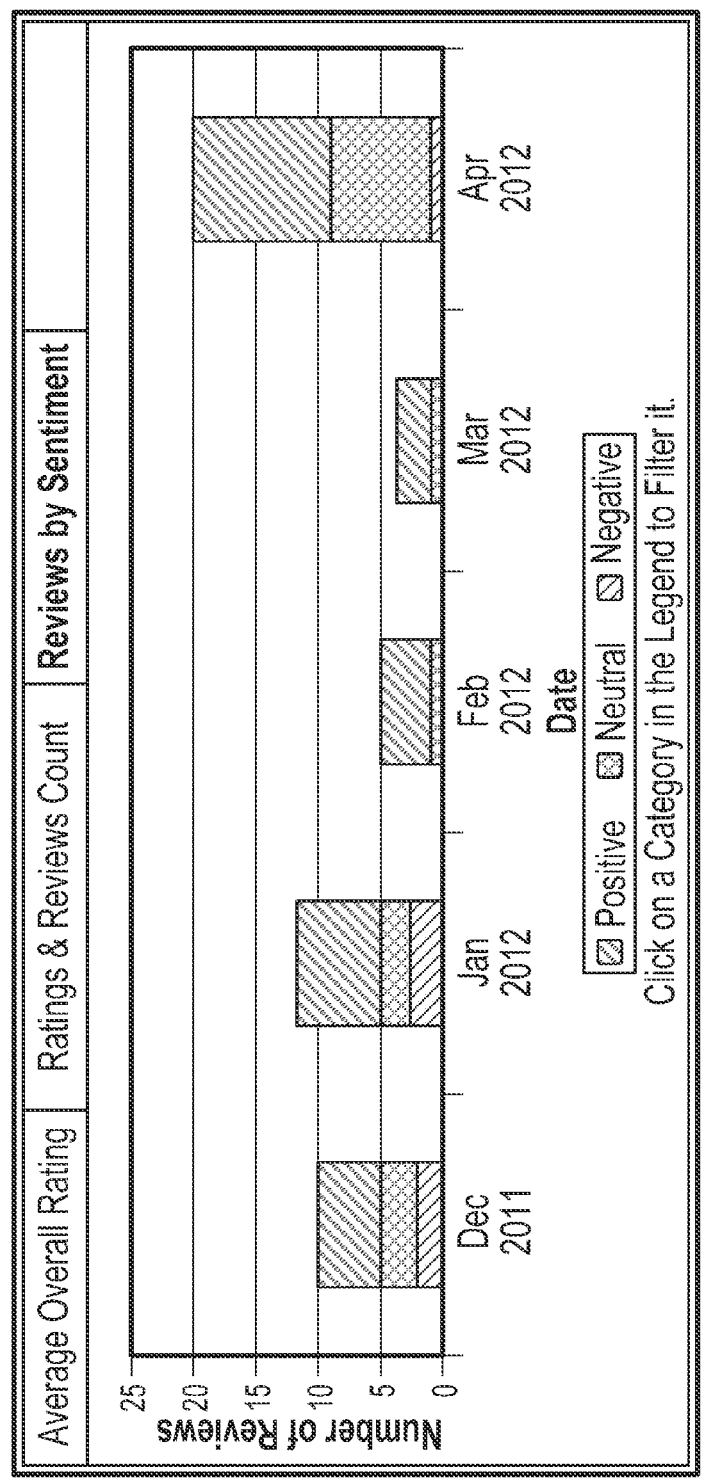
FIG. 13 illustrates a portion of an interface as rendered in a browser.

Alice can view more detailed information pertaining to reviews and ratings by clicking tab 932. Interface 1100 makes available, in region 1102, the individual reviews collected by platform 102 with respect to the filter selections made in region 1104. Alice can further refine which reviews are shown in region 1102 by interacting with checkboxes 1112. Summary score information is provided in region 1106, and the number of reviews implicated by the filter selections is presented in region 1108. Alice can select one of three different graphs to be shown in region 1110. As shown in FIG. 11, the first graph shows how the average rating across the filtered set of reviews has changed over the selected time period. If Alice clicks on region 1114, she will be presented with the second graph. As shown in FIG. 12, the second graph shows the review volume over the time period. Finally, if Alice clicks on region 1116, she will be presented with the third graph. As shown in FIG. 13, the third graph shows a breakdown of reviews by type (e.g., portion of positive, negative, and neutral reviews).

Figure 14:
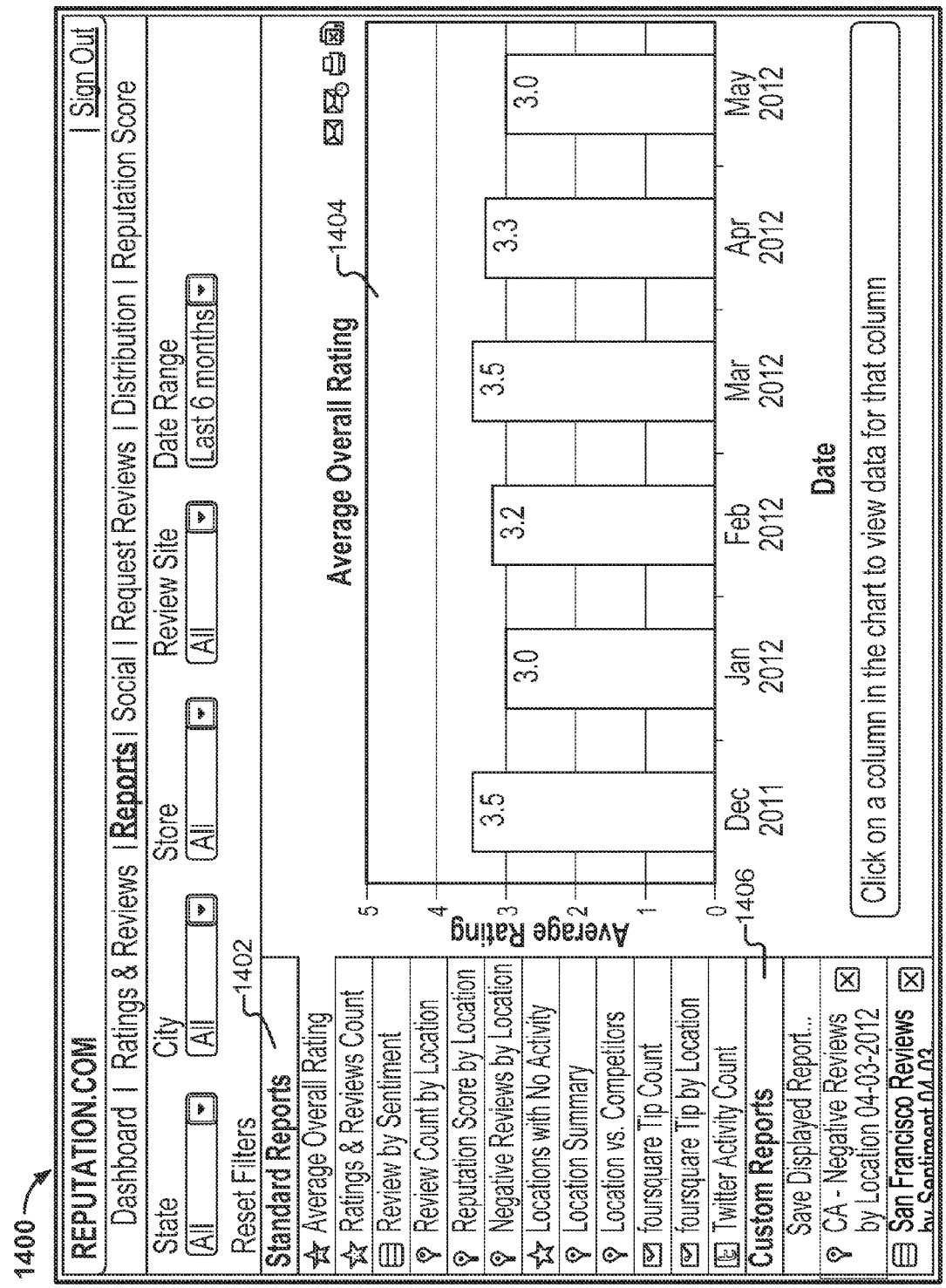
FIG. 14 illustrates an example of an interface as rendered in a browser.
Figure 15:
FIG. 15 illustrates a portion of an interface as rendered in a browser.

If Alice clicks on tab 934, she will be presented with interface 1400 of FIG. 14, which allows her to view a variety of standard reports by selecting them from regions 1402 and 1406. Alice can also create and save custom reports. One example report is shown in region 1404. In particular, the report indicates, for a given date range, the average rating on a normalized (to 5) scale. A second example report is shown in FIG. 15. Report 1500 depicts the locations in the selected data range that are declining in reputation most rapidly. In particular, what is depicted is the set of locations that have the largest negative delta in their respective normalized rating between two dates. A third example report is shown in FIG. 16. Report 1600 provides a summary of ACME locations in a list format. Column 1602 shows each location's average review score, normalized to a 5 point scale. Column 1604 shows the location's composite reputation score (e.g., computed using the techniques described in conjunction with FIG. 7). If desired, Alice can instruct platform 102 to email reports such as those listed in region 1402. In particular, if Alice clicks on tab 940, she will be presented with an interface that allows her to select which reports to send, to which email addresses, and on what schedule. As one example, Alice can set up a distribution list that includes the email addresses of all ACME board members and can further specify that the board members should receive a copy of the "Location vs. Competitors" report once per week.

Figure 17:
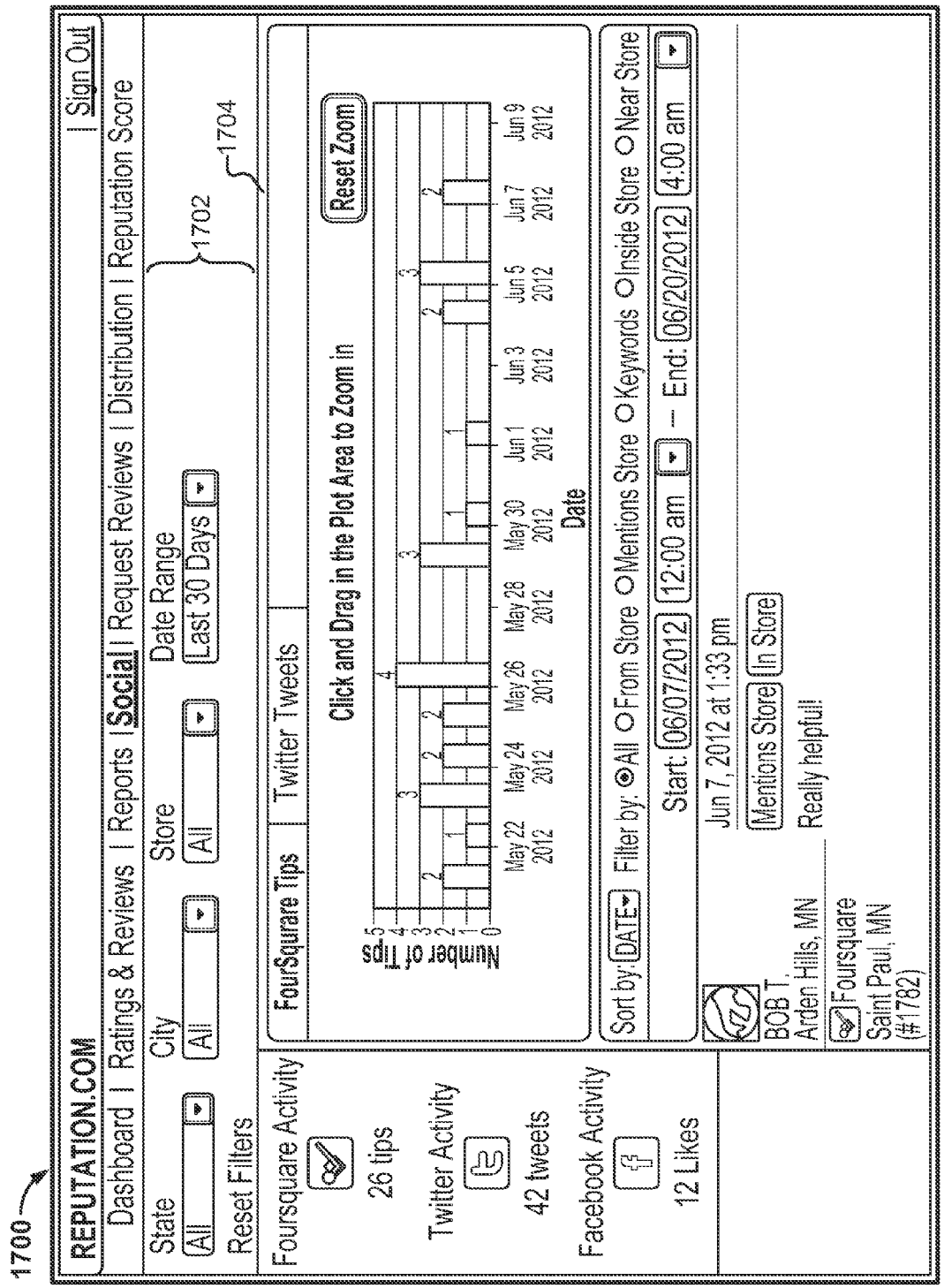
FIG. 17 illustrates an example of an interface as rendered in a browser.

If Alice clicks on tab 936, she will be presented with interface 1700, depicted in FIG. 17. Interface 1700 shows data obtained from platform 102 by social sites such as sites 120-122. As with the review data, Alice can apply filters to the social data by interacting with the controls in region 1702 and can view various reports by interacting with region 1704.

Requesting Reviews

If Alice clicks on tab 938, she will be presented with the interface shown in FIG. 18, which allows her to send an email request for a review. Once an email has been sent, the location is tracked and available in interface 1900, shown in FIG. 19. In the example shown in FIG. 18, Alice is responsible for making decisions such as who to request reviews from, and how frequently, based on tips provided in region 1802 (and/or her own intuition). In various embodiments, platform 102 includes a review request engine that is configured to assist businesses in strategically obtaining additional reviews. In particular, the engine can guide businesses through various aspects of review solicitation, and can also automatically make decisions on the behalf of those businesses. Recommendations regarding review requests can be presented to users in a variety of ways. For example, interface 600 of FIG. 6 can present a suggestion that additional reviews be requested, if applicable. As another example, periodic assessments can be made on behalf of a business, and an administrator of the business alerted via email when additional reviews should be solicited.

Figure 20:
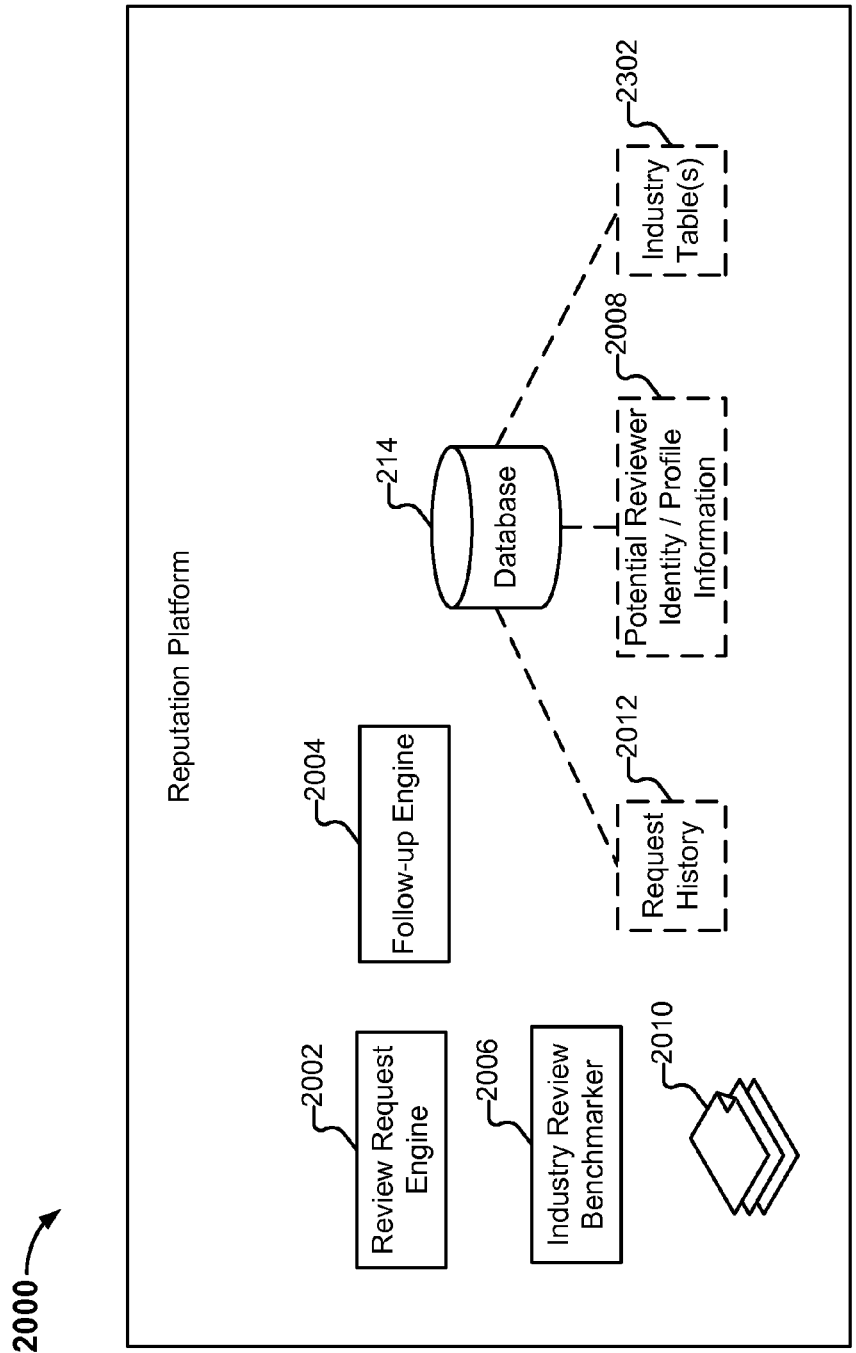
FIG. 20 illustrates an embodiment of a reputation platform that includes a review request engine.

FIG. 20 illustrates an embodiment of a reputation platform that includes a review request engine. Platform 2000 is an embodiment of platform 102. Other components (e.g. as depicted in FIGS. 2 and/or 4 as being included in platform 102) can also be included in platform 2000 as applicable. As will be described in more detail below, review request engine 2002 is configured to perform a variety of tasks. For example, review request engine 2002 can determine which sites (e.g., site 110 or site 112) a given business would benefit from having additional reviews on. In various embodiments, platform 102 performs these determinations at least in part by determining how a business's reputation score would change (whether positive or negative) based on simulating the addition of new reviews to various review sites. Further, review request engine 2002 can determine which specific individuals should be targeted as potential reviewers, and can facilitate contacting those individuals, including by suggesting templates/language to use in the requests, as well as the timing of those requests.

Targeting Review Placement

As explained above (e.g., in the section titled "Additional Examples of Scoring Embodiments"), one factor that can be considered in determining a reputation score for a business is the "review distribution" of the business's reviews. As one example, suppose a restaurant has a review distribution as follows: Of the total number of reviews of the restaurant that are known to platform 102, 10% of those reviews appear on travel-oriented review site 112, 50% of those reviews appear on general purpose review site 110, and 40% of those reviews appear (collectively) elsewhere. In various embodiments, review request engine 2002 is configured to compare the review distribution of the business to one or more target distributions and use the comparison to recommend the targeting of additional reviews.

A variety of techniques can be used to determine the target distributions used by review request engine 2002. For example, as will be described in more detail below, in some embodiments, reputation platform 102 is configured to determine industry-specific review benchmarks. The benchmarks can reflect industry averages or medians, and can also reflect outliers (e.g., focusing on data pertaining to the top 20% of businesses in a given industry). Further, for a single industry, benchmarks can be calculated for different regions (e.g., one for Restaurants-West Coast and one for Restaurants-Mid West). The benchmark information determined by platform 102 can be used to determine target distributions for a business. Benchmark information can also be provided to platform 102 (e.g., by a third party), rather than or in addition to platform 102 determining the benchmark information itself. In some embodiments, a universal target distribution (e.g., equal distribution across all review sites, or specific predetermined distributions) is used globally across all industries.

If a business has a review distribution that is significantly different from a target distribution (e.g., the industry-specific benchmark), the "review distribution" component of the business's reputation score will be negatively impacted. In various embodiments, review request engine 2002 uses a business's review distribution and one or more target distributions to determine on which site(s) additional reviews should be sought.

Figure 21:
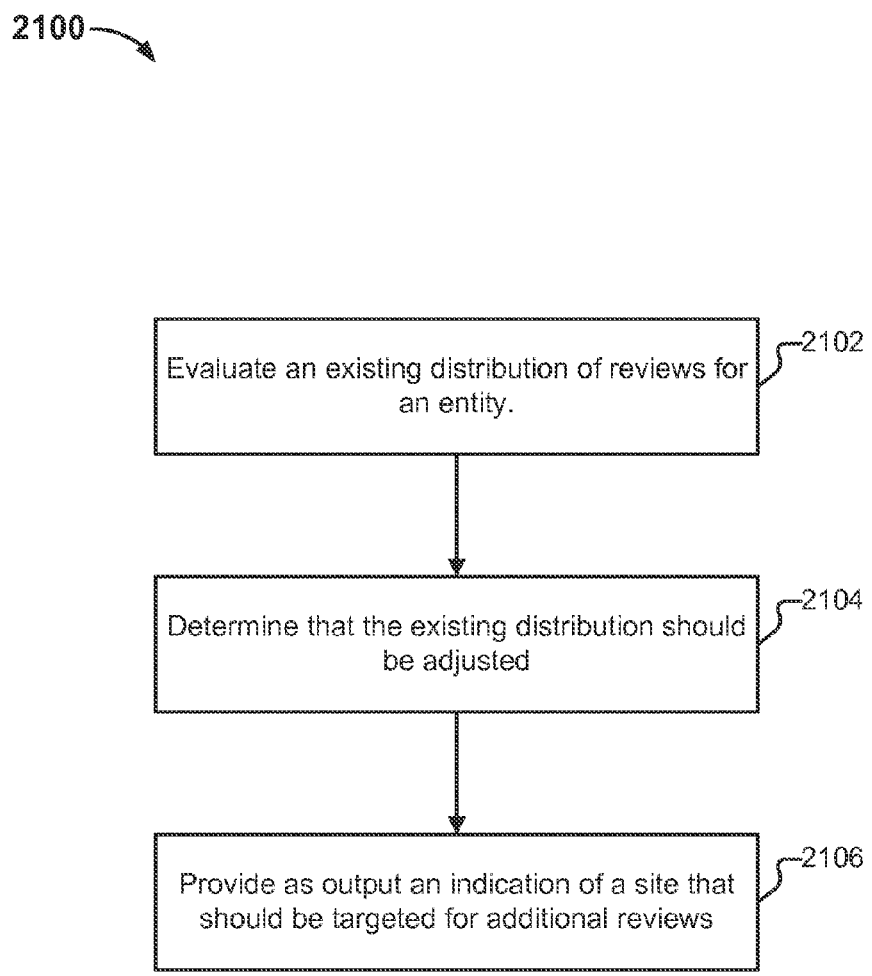
FIG. 21 illustrates an embodiment of a process for targeting review placement.

FIG. 21 illustrates an embodiment of a process for targeting review placement. In some embodiments process 2100 is performed by review request engine 2002. The process begins at 2102 when an existing distribution of reviews for an entity is evaluated across a plurality of review sites. A determination is made, at 2104, that the existing distribution should be adjusted. Finally, at 2106, an indicator of at least one review site on which placement of at least one additional review should be targeted is provided as output.

One example of process 2100 is as follows: Once a week, the review distribution for a single location dry cleaner ("Mary's Dry Cleaning") is determined by platform 102. In particular, it is determined that approximately 30% of Mary's reviews appear on site 110, approximately 30% appear on site 112, and 40% of Mary's reviews appear elsewhere (2102). Suppose a target distribution for a dry cleaning business is: 70% site 110, 10% site 112, and 20% remainder. Mary's review distribution is significantly different from the target, and so, at 2104 a determination is made that adjustments to the distribution should be sought. At 2106, review request engine 2002 provides as output an indication that Mary's could use significantly more reviews on site 110. The output can take a variety of forms. For example, platform 102 can send an email alert to the owner of Mary's Dry Cleaning informing her that she should visit platform 102 to help correct the distribution imbalance. As another example, the output can be used internally to platform 2002, such as by feeding it as input into a process such as process 2500.

As will be described in more detail below, in some embodiments, the target distribution is multivariate, and includes, in addition to a proportion of reviews across various sites, information such as target timeliness for the reviews, a review volume, and/or a target average score (whether on a per-site basis, or across all applicable sites). Multivariate target distributions can also be used in process 2100. For example, suppose that after a few weeks of requesting reviews (e.g., using process 2100), the review distribution for Mary's Dry Cleaning is 68% site 110, 12% site 112, and 20% remainder (2102). The site proportions in her current review distribution are quite close to the target. However, other aspects of her review distribution may nonetheless deviate significantly from aspects of a multivariate target and need adjusting to bring up her reputation score. For example, the industry target may be a total of 100 reviews (i.e., total review volume) and Mary's Dry Cleaning may only have 80 total reviews. Or, the industry target average age of review may be six months, while the average age for Mary's Dry Cleaning is nine months. Decisions made at 2104 to adjust the existing review distribution can take into account such non-site-specific aspects as well. In some embodiments these additional aspects of a target distribution are included in the distribution itself (e.g., within a multivariate distribution). In other embodiments, the additional information is stored separately (e.g. in a flat file) but is nonetheless used in conjunction with process 2100 when determining which sites to target for additional reviews. Additional information regarding multivariate distribution targets is provided below (e.g., in the section titled "Industry Review Benchmarking").

Another example of process 2100 is as follows: Once a week, the review distribution of each location of a ten-location franchise is determined (2102). Comparisons against targets can be done individually on behalf of each location, e.g., with ten comparisons being performed against a single, industry-specific target. Comparisons can also be performed between the locations. For example, of the ten locations, the location having the review distribution that is closest to the industry-specific target can itself be used to create a review target for the other stores. The review distributions of the other stores can be compared against the review distributions of the top store, instead of or in addition to being compared against the industry target.

In some embodiments, additional processing is performed in conjunction with process 2100. For example, as part of (or prior to) portion 2102 of the process, a determination can be made as to whether or not the entity has a presence on (e.g., has a registered account with) each of the sites implicated in the target distribution. If an entity is expected to have a non-zero number of reviews on a given site (in accordance with the target distribution), having a presence on that site is needed. As one example, a car dealer business should have an account on review site 114 (a car dealer review site). A restaurant need not have an account on the site, and indeed may not qualify for an account on the site. If the car dealer business does not have an account with site 114, a variety of actions can be taken by platform 102. As one example, an alert that the car dealer is not registered with a site can be emailed to an administrator of the car dealer's account on platform 102. As another example, the output provided at 2106 can include, e.g., in a prominent location, a recommendation that the reader of the output register for an account with site 114. In some embodiments, platform 102 is configured to register for an account on (or otherwise obtain a presence on) the site, on behalf of the car dealer.

Industry Review Benchmarking

As discussed above, review request engine 2002 can use a variety of target distributions, obtained in a variety of ways, in performing process 2100. Two examples of target distributions are depicted in FIGS. 22 and 23, respectively.

Figure 22:
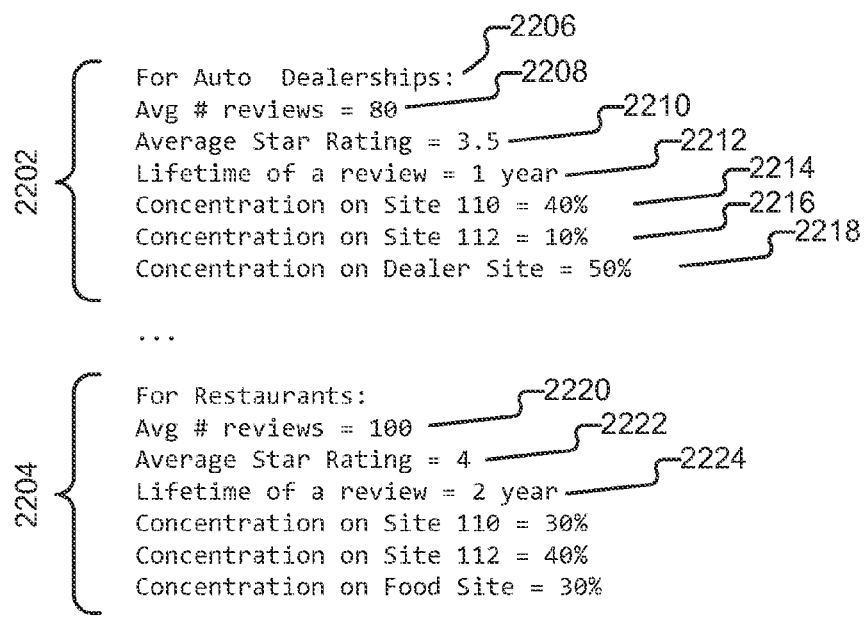
FIG. 22 illustrates an example of a target distribution.
Figure 23:
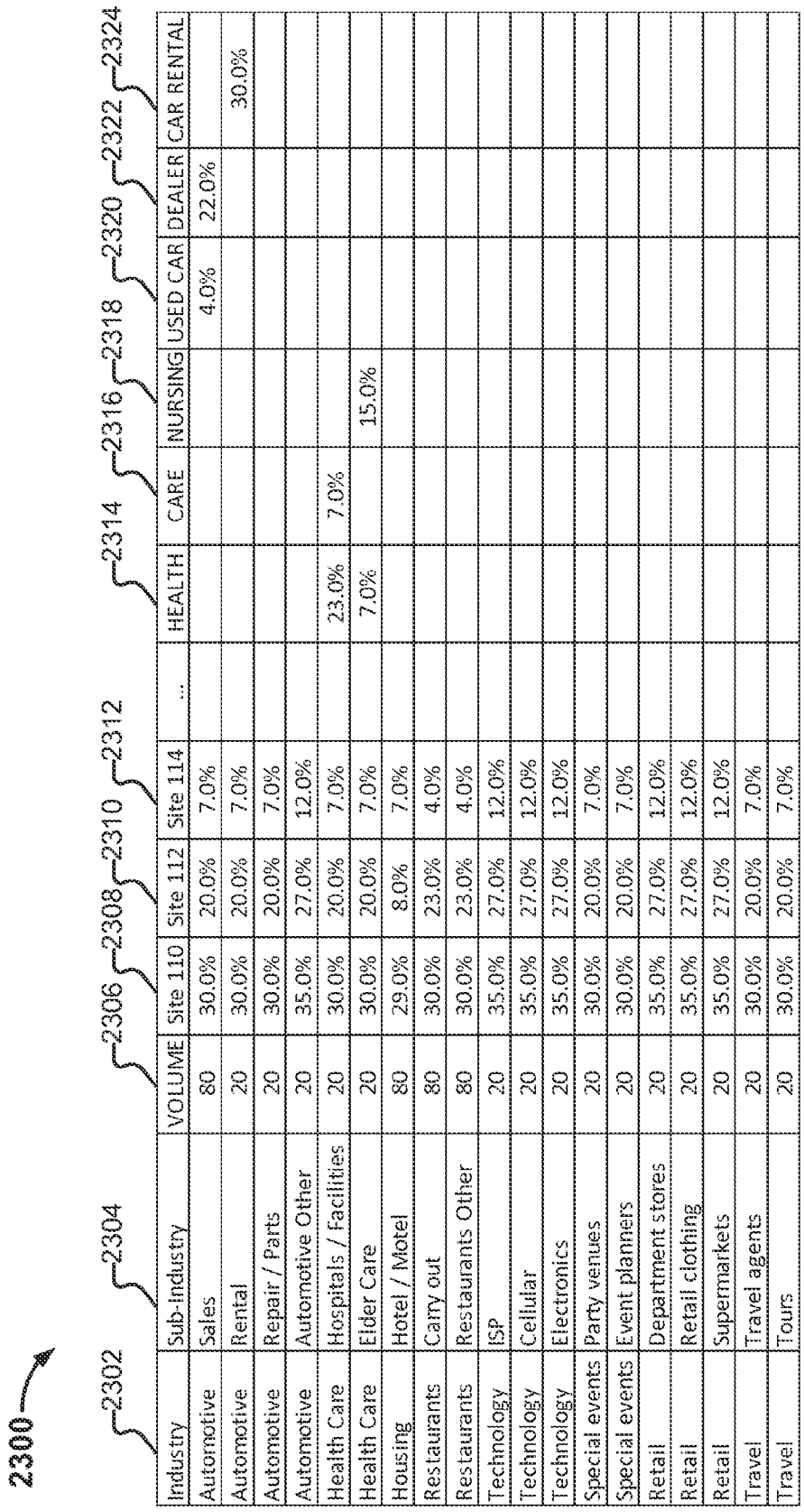
FIG. 23 illustrates an example of a target distribution.

The target distributions shown in FIG. 22 are stored as groups of lines (2202, 2204) in a single flat file, where an empty line is used as a delimiter between industry records. The first line (e.g., 2206) indicates the industry classification (e.g., Auto Dealership). The second line (e.g., 2208) indicates a target review volume across all websites (e.g., 80). The third line (e.g., 2210) indicates the industry average review rating, normalized to a 5 point scale (e.g., 3.5). The fourth line (e.g., 2212) indicates for how long of a period of time a review will be considered "fresh" (e.g., 1 year) and thus count in the calculation of a business in that industry's reputation score. In some embodiments, in addition to or instead of a specific freshness value, a decay factor is included, that is used to reduce the impact of a particular review in the calculation of a business's reputation score over time. The remaining lines of the group (2214-2218) indicate what percentage of reviews should appear on which review sites. For example, 40% of reviews should appear on general purpose review site 110; 10% of reviews should appear on travel review site 112; and 50% of reviews should appear on a review site focused on auto dealers.

As shown in FIG. 22, different industries can have different values in their respective records. For example, a target review volume for restaurants is 100 (2220), the industry average review rating is 4 (2222), and the freshness value is two years (2224). The target review distribution is also different.

The target distributions depicted in FIG. 22 can be used to model the impact that additional reviews would have for a business. For example, for a given car dealer business, simulations of additional reviews (e.g., five additional positive reviews obtained on site 110 vs. three additional positive reviews obtained on site 112) can be run, and a modeled reputation score (e.g., using techniques described in "Example Score Generation" above) determined. Whichever simulation results in the highest reputation score can be used to generate output at 2106 in process 2100.

FIG. 23 illustrates another example of a target distribution. For a given business, the first two columns of table 2300 list an industry (2302) and sub-industry (2304). The next column lists the target review volume (2306). The remaining columns provide target review proportions with respect to each of sites 2308-2324. As shown in FIG. 23, many of the cells in the table are empty, indicating that, for a given type of business, only a few review sites significantly impact the reputations of those businesses. For example, while car dealers and car rental businesses are both impacted by reviews on sites 110-114 (2308-2312), reviews on site 2322 (a dealer review site) are important to car dealers, but not important to car rental businesses (or entirely different industries, such as restaurants). As another example, reviews of hospitals appearing on a health review site 2314 are almost as important as reviews appearing on site 110. However, reviews appearing on site 2314 are considerably less important to elder care businesses, while reviews on a niche nursing review site 2318 matter for nursing homes but not hospitals.

A small subset of data that can be included in a distribution (also referred to herein as an industry table) is depicted in FIG. 23. In various embodiments, hundreds of rows (i.e., industries/sub-industries) and hundreds of columns (i.e., review sites) are included in the table. Further, additional types of information can be included in table 2300, such as freshness values, review volume over a period of time (e.g., three reviews per week), decay factors, average scores, etc.

As previously explained, target distributions can be provided to platform 102 in a variety of ways. As one example, an administrator of platform 102 can manually configure the values in the file depicted in FIG. 22. As another example, the top business in each category (i.e., the business having the highest reputation score) can be used as a model, and its values copied into the appropriate area of file depicted in FIG. 22, whether manually or programmatically. As yet another example, process 2400 can be used to generate target distribution 2300.

Figure 24:
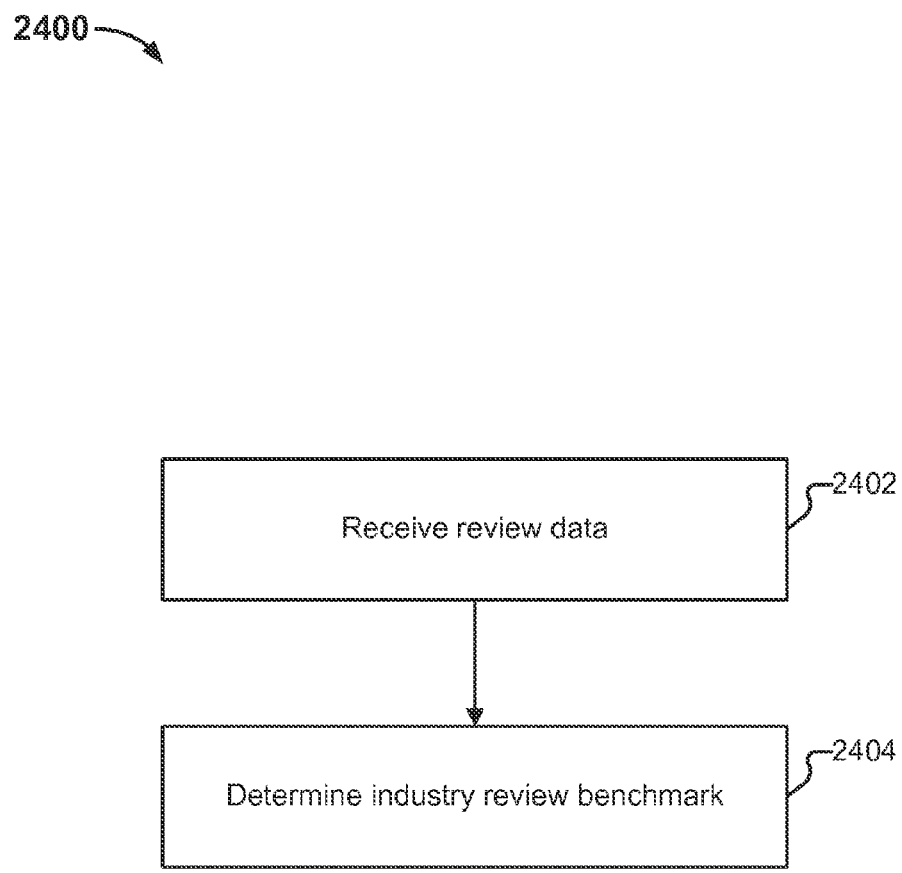
FIG. 24 illustrates an embodiment of a process for performing an industry review benchmark.

FIG. 24 illustrates an embodiment of a process for performing an industry review benchmark. In some embodiments, process 2400 is performed by industry benchmarking module 2006 to create/maintain industry table 2300. For example, benchmarking module 2006 can be configured to execute process 2400 once a month. Benchmarking module 2006 can also execute process 2400 more frequently, and/or can execute process 2400 at different times with respect to different industries (e.g., with respect to automotive industries one day each week and with respect to restaurants another day each week), selectively updating portions of table 2300 instead of the entire table at once. In some embodiments, process 2400 is performed multiple times, resulting in multiple tables. For example, platform 102 can be configured to generate region-specific tables.

The process begins at 2402 when review data is received. As one example, at 2402, industry benchmarker 2006 queries database 214 for information pertaining to all automotive sales reviews. For each automotive sales business (e.g., a total of 16,000 dealers), summary information such as each dealer's current reputation score, current review distribution, and current review volume is received at 2402.

At 2404, the received data is analyzed to determine one or more benchmarks. As one example, benchmarker 2006 can be configured to average the information received at 2402 into a set of industry average information (i.e., the average reputation score for a business in the industry; the averaged review distribution; and the average review volume). Benchmarker 2006 can also be configured to consider only a portion of the information received at 2402 when determining a benchmark, and/or can request information for a subset of businesses at 2402. As one example, instead of determining an industry average at 2404, benchmarker 2006 can consider the information pertaining to only those businesses having reputation scores in the top 20% of the industry being benchmarked. In some embodiments, multiple benchmarks are considered (e.g., in process 2100) when making determinations. For example, both an industry average benchmark, and a "top 20%" benchmark can be considered (e.g., by being averaged themselves) when determining a target distribution for a business.

In some embodiments, additional processing is performed at 2404 and/or occurs after 2404. For example, a global importance of a review site (e.g., its Page Rank or Alexa Rank) is included as a factor in the target distribution, or is used to weight a review site's values in table 2300.

In various embodiments, the industry benchmarked during process 2400 is segmented and multiple benchmarks are determined (e.g., one benchmark for each segment, along with an industry-wide benchmark). As one example, suppose the industry being benchmarked is Fast Food Restaurants. In some embodiments, in addition to an industry-wide benchmark, benchmarks are determined for various geographic sub-regions. One reason for performing regional benchmarking is that different populations of people may rely on different review websites for review information. For example, individuals on the West Coast may rely heavily on site 112 for reviews of restaurants, while individuals in the Mid West may rely heavily on a different site. In order to improve its reputation score, a restaurant located in Ohio will likely benefit from a review distribution that more closely resembles that of other Mid Western restaurants than a nationwide average distribution.

Reviewer Recommendation

Figure 25:
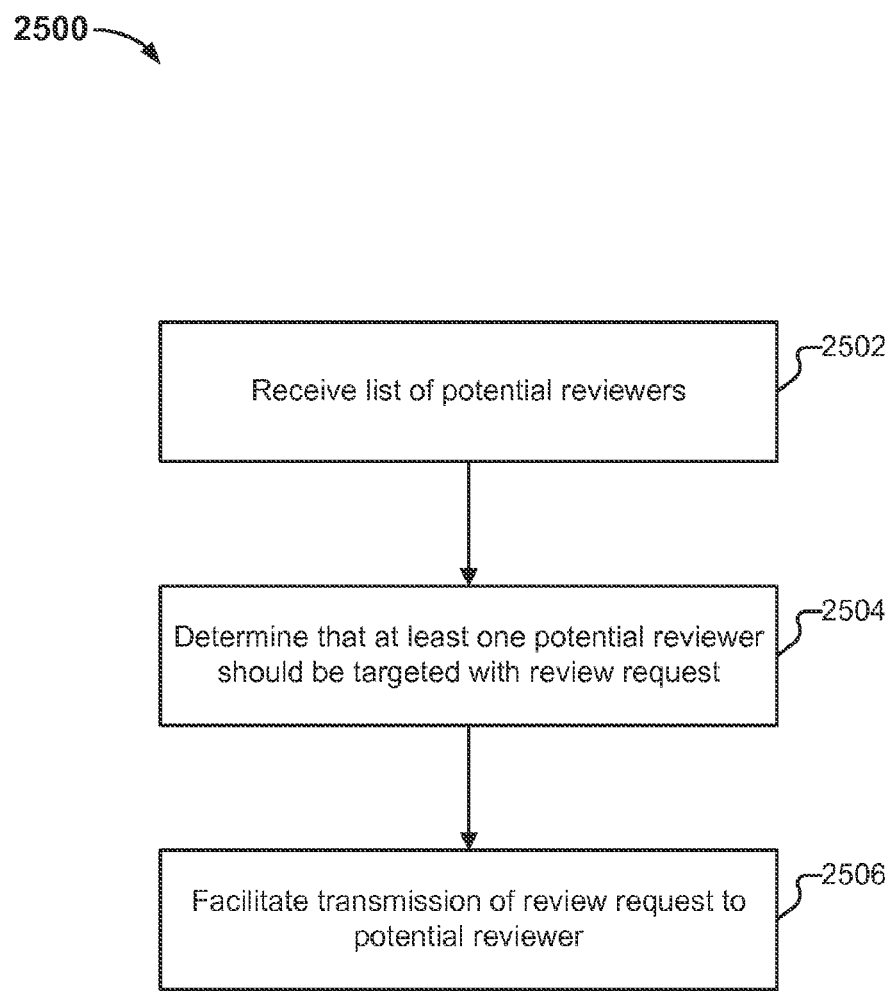
FIG. 25 illustrates an embodiment of a process for recommending potential reviewers.

FIG. 25 illustrates an embodiment of a process for recommending potential reviewers. In some embodiments, process 2500 is performed by review request engine 2002. The process begins at 2502 when a list of potential reviewers is received. The list can be received in a variety of ways. As one example, a list of potential reviewers can be received at 2502 in response to, or in conjunction with, the processing performed at 2106. As another example, a business, such as a car dealership, can periodically provide platform 102 a list of new customers (i.e., those people who have recently purchased cars) including those customers' email addresses (at 2502). As yet another example, a business can provide to platform 102 a comprehensive list of all known customers (e.g., those subscribed to the business's email newsletters and/or gleaned from past transactions). In some embodiments, customer email addresses are stored in database 214 (2008), and a list of reviewers is received at 2502 in response to a query of database 214 being performed.

At 2504, a determination is made that at least one individual on the received list should be targeted with a review request. A variety of techniques can be used to make this determination. As one example, all potential reviewers received at 2502 could be targeted (e.g., because the list received at 2502 includes an instruction that all members be targeted). As another example, suppose as a result of process 2100, a determination was made that a business would benefit from more reviews on Google Places. At 2504, any members of the list received at 2502 that have Google email addresses (i.e., @gmail.com addresses) are selected at 2504. One reason for such a selection is that the individuals with @gmail.com addresses will be more likely to write reviews on Google Places (because they already have accounts with Google). A similar determination can be made at 2504 with respect to other domains, such as by selecting individuals with @yahoo.com addresses when additional reviews on Yahoo! Local are recommended.

Whether or not an individual has already registered with a review site can also be determined (and therefore used at 2504) in other ways as well. For example, some review sites may provide an API that allows platform 102 to confirm whether an individual with a particular email address has an account with that review site. The API might return a "yes" or "no" response, and may also return a user identifier if applicable (e.g., responding with "CoolGuy22" when presented with a particular individual's email address). As another example, where the site does not provide such an API, a third party service may supply mappings between email addresses and review site accounts to platform 102. As yet another example, the automobile dealer could ask the purchaser for a list of review sites the user has accounts on and/or can present the customer with a list of review sites and ask the customer to indicate which, if any, the customer is registered with.

In various embodiments, any review site accounts/identifiers determined to be associated with the customer are stored in database 214 in a profile for the individual. Other information pertinent to the individual can also be included in the profile, such as the number of reviews the user has written across various review sites, the average rating per review, and verticals (e.g., health or restaurants) associated with those reviews.

Additional/alternate processing is performed at 2504 in various embodiments. As one example, database 214 can be queried for information pertaining to each of the potential reviewers received at 2502 and an analysis can be performed on the results. Individuals who have a history of writing positive reviews in general, of writing positive reviews in the same vertical, of writing positive reviews in a different vertical, of frequently writing reviews, of writing high quality reviews (e.g., having a certain minimum length or including multimedia) irrespective of whether the review itself is positive, can be selected. Individuals with no histories and/or with any negative aspects to their review histories can be removed from consideration, as applicable. In some embodiments, an examination of the potential reviewer (e.g., an analysis of his or her existing reviews) is performed on demand, in conjunction with the processing of 2504. In other embodiments, reviewer evaluations are performed asynchronously, and previously-performed assessments (e.g., stored in database 214) are used in evaluating potential reviewers at 2504.

In various embodiments, review request engine 2002 is configured to predict a likelihood that a potential reviewer will author a review and to determine a number of reviews to request to arrive at a target number of reviews. For example, suppose a company would benefit from an additional five reviews on site 110 and that there is a 25% chance that any reviewer requested will follow through with a review. In some embodiments, engine 2002 determines that twenty requests should be sent (i.e., to twenty individuals selected from the list received at 2502). Further, various thresholding rules can be employed by platform 102 when performing the determination at 2504. For example, a determination may have been made (e.g., as an outcome of process 2100) that a business would benefit from fifty additional reviews being posted to site 110. However, it may also be the case that site 110 employs anti-gaming features to identify and neutralize excessive/suspicious reviews. In some embodiments, platform determines limits on the number of requests to be made and/or throttles the rate at which they should be made at 2504.

At 2506, transmission of a review request to a potential reviewer is facilitated. The processing of 2506 can be performed in a variety of ways. As one example, all potential reviewers determined at 2504 can be emailed identical review request messages by platform 102, in accordance with a template 2010 stored on platform 102. Information such as the name of the business to be reviewed, and the identity of each potential reviewer is obtained from database 214 and used to fill in appropriate fields of the template. In various embodiments, different potential reviewers of a given business receive different messages from platform 102. For example, the message can include a specific reference to one or more particular review site(s), e.g., where the particular reviewer has an account. Thus one potential reviewer might receive a message including the phrase, "please review us on Site 110," while another might receive a message including the phrase, "please review us on Site 112." In various embodiments, multiple review sites are mentioned in the request, and the position of the respective site varies across the different requests sent to different potential reviewers. For example, the request can include a region such as region 1804 as depicted in FIG. 18. The ordering of the sites can be based on factors such as the concentration of new reviews needed to maximize a business's score increase, and/or factors such as where the potential reviewer already has an account and/or is otherwise most likely to complete a review.

Where statistical information is known about the potential reviewer (e.g., stored in database 214 is information that the reviewer typically writes reviews in the evening or in the morning), that information can be used in conjunction with facilitating the transmission of the review request (e.g., such that the review is sent at the time of day most likely to result in the recipient writing a review). Where statistical information is not known about the specific potential reviewer, statistical information known about other individuals can be used for decision-making Different potential reviewers can also be provided messages in different formats. For example, some reviewers can be provided with review request messages via email, while other reviewers can be provided with review requests via social networking websites, via postal mail, or other appropriate contact methods.

In various embodiments, A/B testing is employed by platform 102 in message transmission. For example, a small number of requests can be sent—some at one time of day and the others at a different time of day (or sent on different days of week, or with different messaging). Follow-up engine 2004 can be configured to determine, after a period of time (e.g., 24 hours) how many of the targeted reviewers authored reviews, and to use that information as feedback in generating messages for additional potential reviewers. Other information pertaining to the message transmission (and its reception) can also be tracked. For example, message opens and message click throughs (and their timing) can be tracked and stored in database 214 (2012).

Follow-Up Determination

Figure 26:
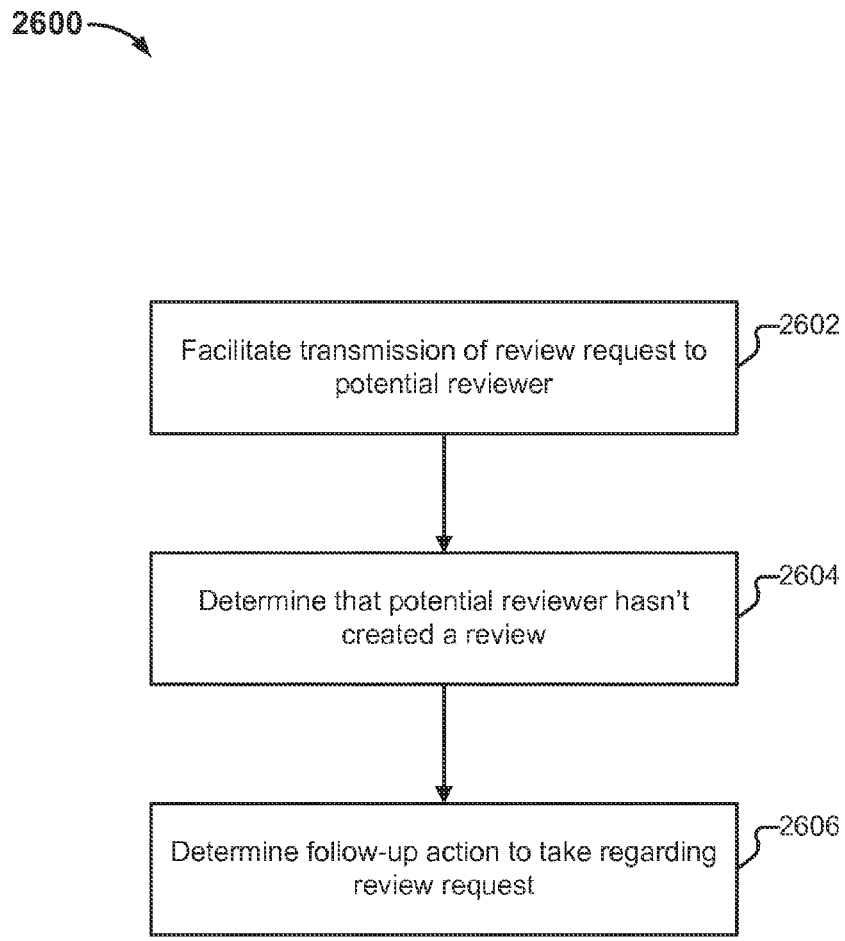
FIG. 26 illustrates an embodiment of a process for determining a follow-up action.

FIG. 26 illustrates an embodiment of a process for determining a follow-up action. In some embodiments, process 2600 is performed by platform 102. The process begins at 2602 when a transmission of a review request is facilitated. In some embodiments, portion 2506 of process 2500, and portion 2602 of process 2600 are the same.

At 2604, a determination is made that the potential reviewer, to whom the review request was transmitted at 2602, has not responded to the request by creating a review. In some embodiments, portion 2604 of process 2600 is performed by follow-up engine 2004. As one example, when an initial review request is sent (e.g., at 2506), information (2012) associated with that request is stored in database 214. Follow-up engine 2004 periodically monitors appropriate review sites to determine whether the potential reviewer has created a review. If engine 2004 determines that a review was authored, in some embodiments, no additional processing is performed by follow-up engine 2004 (e.g., beyond noting that a review has been created and collecting statistical information about the review, such as the location of the review, and whether the review is positive or negative). In other embodiments, platform 102 takes additional actions, such as by sending the reviewer a thank you email. In the event it is determined that no review has been created (2604), follow-up engine 2004 determines a follow-up action to take regarding the review request.

A variety of follow-up actions can be taken, and cam be based on a variety of factors. As one example, follow-up engine 2004 can determine, from information 2012 (or any other appropriate source), whether the potential reviewer opened the review request email. The follow-up engine can also determine whether the potential reviewer clicked on any links included in the email. Follow-up engine 2004 can select different follow-up actions based on these determinations. For example, if the potential reviewer did not open the email, one appropriate follow-up action is to send a second request, with a different subject line (i.e., in the hopes the potential reviewer will now open the message). If the potential reviewer opened the email, but didn't click on any links, an alternate message can be included in a follow-up request. If the potential reviewer opened the email and clicked on a link (but did not author a review) another appropriate action can be selected by follow-up engine 2004 as applicable, such as by featuring a different review site, or altering the message included in the request. Another example of a follow-up action includes contacting the potential reviewer using a different contact method than the originally employed one. For example, where a request was originally sent to a given potential reviewer via email, follow-up engine 2004 can determine that a follow-up request be sent to the potential reviewer via a social network, or via a physical postcard. Another example of a follow-up action includes contacting the potential reviewer at a different time of day than was employed in the original request (e.g., if the request was originally sent in the morning, send a follow-up request in the evening).

In various embodiments, follow-up engine 2004 is configured to determine a follow-up schedule. For example, based on historical information (whether about the potential reviewer, or based on information pertaining to other reviewers), follow-up engine 2004 may determine that a reminder request (asking that the potential reviewer write a review) should be sent on a particular date and/or at a particular time to increase the likelihood of a review being authored by the potential reviewer. Follow-up engine can also determine other scheduling optimizations, such as how many total times requests should be made before being abandoned, and/or what the conditions are for ceasing to ask the potential reviewer for a review. In various embodiments, A/B testing is employed (e.g., with respect to a few potential reviewers that did not write reviews) by follow-up engine 2004 to optimize follow-up actions.

Figure 27:
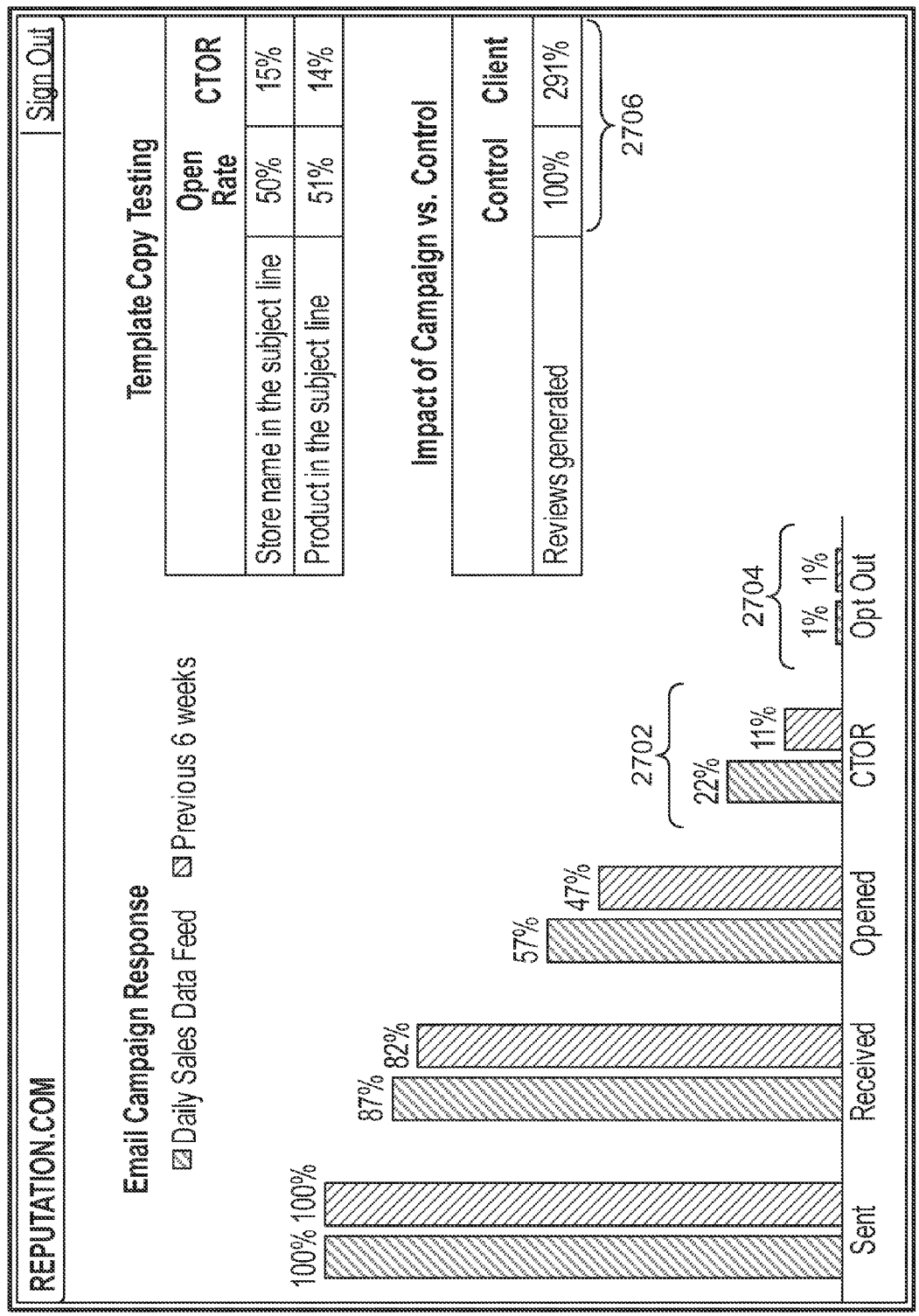
FIG. 27 illustrates a portion of an interface as rendered in a browser.

FIG. 27 illustrates a portion of an interface as rendered in a browser. In particular, interface 2700 provides feedback (e.g., to a business owner) regarding two six-week periods of a review request campaign that includes follow-up. As shown, the current campaign has led to approximately twice as many "click throughs" (2702) while not resulting in any additional "opt-outs" (2704). Further, the current campaign has resulted in nearly triple the number of reviews (2706) being written.

Stimulating Reviews at a Point of Sale

One problem for some businesses, such as fast food restaurants, is that visiting such restaurants and receiving the expected quality of service/food is sufficiently routine/mundane that most people will not bother to write a positive review of their experience on a site, such as site 112. Only where people experience a significant problem will they be sufficiently motivated to author a review, leading to the overall review that is likely unfairly negative.

Figure 28:
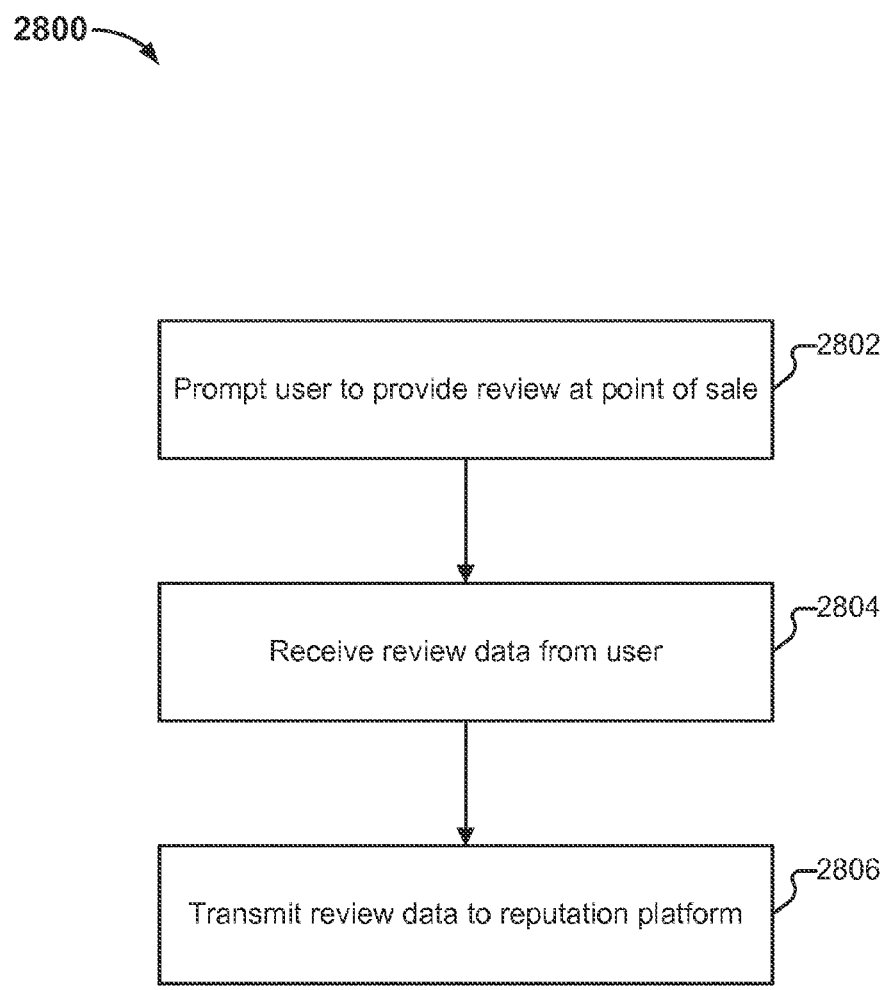
FIG. 28 illustrates an embodiment of a process for stimulating reviews.

FIG. 28 illustrates an embodiment of a process for stimulating reviews. In some embodiments, process 2800 is performed on a device (e.g., one having interface 2900). The process begins at 2802 when a user is prompted to provide a review at a point of sale. In various embodiments, businesses make available devices that visitors can use to provide feedback while they are at the business. For example, a visitor can be handed a tablet and asked for feedback prior to leaving. As another example, a kiosk can be placed on premise and visitors can be asked to visit and interact with the kiosk.

Figure 29:
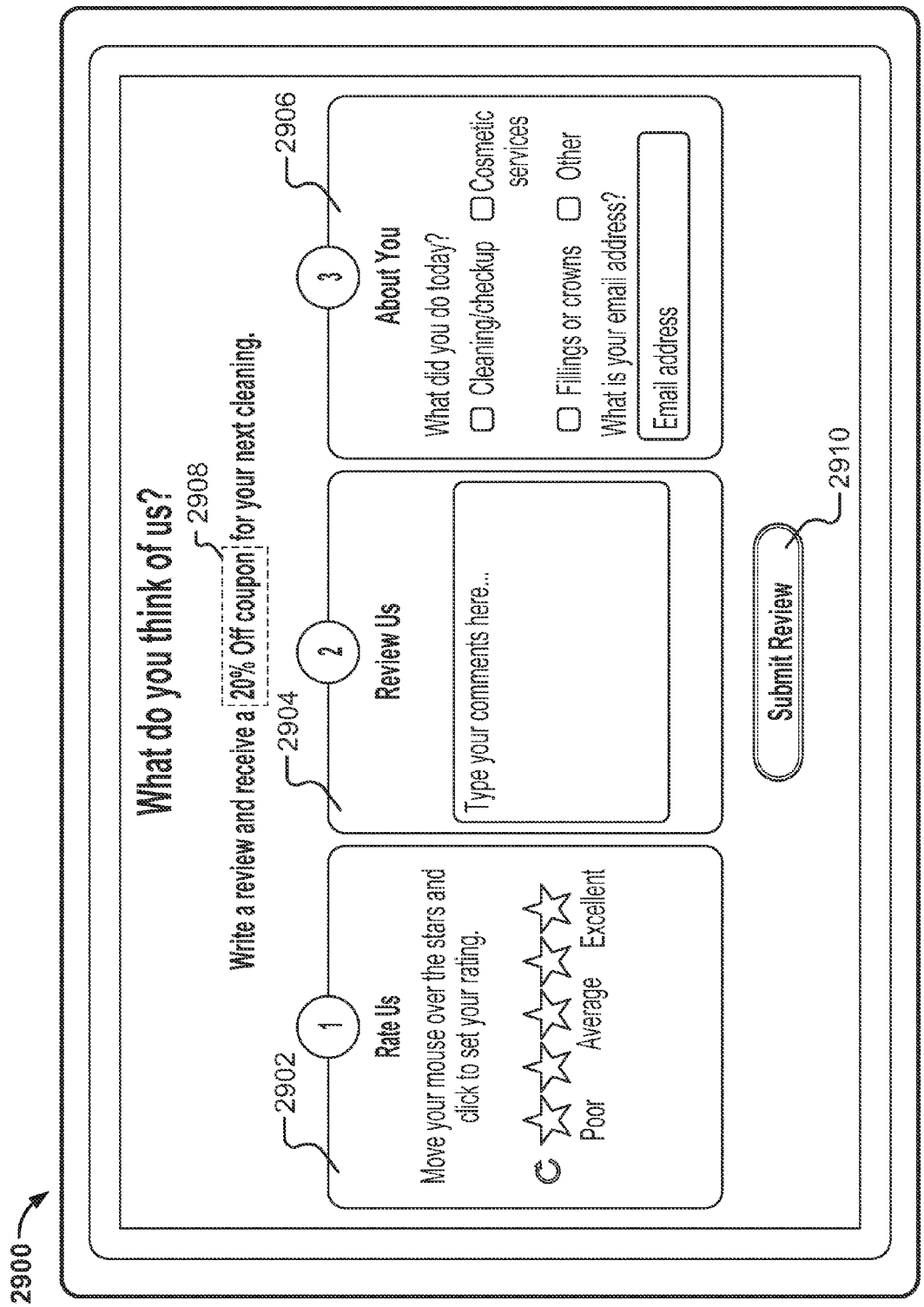
FIG. 29 illustrates an interface.

Illustrated in FIG. 29 is an interface 2900 to such devices. In region 2902, the visitor is asked to provide a rating. In region 2904, the visitor is asked to provide additional feedback. And, in region 2906, the visitor is asked to provide an email address and identify other information, such as the purpose of the visitor's visit. In region 2908, the visitor is offered an incentive for completing the review (but is not required to provide a specific type of review (e.g., positive review)). When the visitor has completed filling out the information asked in interface 2900, the user is asked to click button 2910 to submit the review. When the visitor clicks button 2910, the device receives the review data (at 2804 of process 2800). Finally, at 2806, the device transmits the visitor's review data to platform 102.

In various embodiments, platform 102 is configured to evaluate the review data. If the review data indicates that the visitor is unhappy (e.g., a score of one or two), a remedial action can be taken, potentially while the visitor is still in the store. For example, a manager can be alerted that the visitor is unhappy and can attempt to make amends in person. As another example, the manager can write to the visitor as soon as possible, potentially helping resolve/diffuse the visitor's negativity prior to the visitor reaching a computer (e.g., at home or at work) and submitting a negative review to site 112. In various embodiments, platform 102 is configured to accept business-specific rules regarding process 2900. For example, a representative of a business can specify that, for that business, "negative" is a score of one through three (i.e., including neutral reviews) or that a "positive" is a score of 4.5 or better. The business can also specify which actions should be taken—e.g., by having a manager alerted to positive reviews (not just negative reviews).

If the review data indicates that the visitor is happy (e.g., a score of four or five), a different action can be taken. As one example, platform 102 can automatically contact the visitor (via the visitor's self-supplied email address), provide a copy of the visitor's review information (supplied via interface 2900), and ask that the visitor post the review to a site such as site 110 or site 112. As another example, if the visitor is still interacting with the device at the time, platform 102 can instruct the device to ask the visitor for permission to post the review on the visitor's behalf. As needed, the device, and/or platform 102 can facilitate the posting (e.g., by obtaining the user's credentials for a period of time).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
 solicit a user who, at the time of the solicitation, is located on a premise of a business, to provide a review for the business;
 receive review data from the user while the user is located on the business premise;
 transmit the review data to a reputation platform configured to evaluate the received review data including by determining, based at least in part on the received review data and one or more thresholds, that at least one action should be attempted with respect to the user in person while the user is located on the business premise; and
 receive an alert from the reputation platform that one or more personnel associated with the business premise should take the at least one action with respect to the user in person; and
a memory coupled to the processor and configured to provide the processor with instructions.

2. The system of claim 1 wherein the reputation platform is configured to evaluate the received review data at least in part by determining whether the review data is indicative of a positive or a negative review.

3. The system of claim 2 wherein, in response to a determination by the reputation platform that the review data is positive, the reputation platform is configured to initiate a review request action associated with the user.

4. The system of claim 3 wherein the review request action comprises sending an email to the user asking the user to post a review to a review site.

5. The system of claim 3 wherein the review request action comprises sending an instruction to the processor.

6. The system of claim 5 wherein the instruction comprises an instruction to display a request to the user asking the user's permission to post the review to a review site.

7. The system of claim 1 wherein the at least one action comprises a remedial action.

8. The system of claim 7 wherein the remedial action comprises sending an alert to a manager.

9. The system of claim 1 wherein the processor is configured to determine whether the review data is indicative of a positive or a negative review prior to transmitting the review data to the reputation platform.

10. A method, comprising:
soliciting a user who, at the time of the solicitation, is located on a premise of a business, to provide a review for the business;
receiving, at a processor, review data from the user while the user is located on the business premise;
transmitting the review data to a reputation platform configured to evaluate the received review data including by determining, based at least in part on the received review data and one or more thresholds, that at least one action should be attempted with respect to the user in person while the user is located on the business premise; and
receiving an alert from the reputation platform that one or more personnel associated with the business premise should take the at least one action with respect to the user in person.

11. The method of claim 10 wherein the reputation platform is configured to evaluate the received review data at least in part by determining whether the review data is indicative of a positive or a negative review.

12. The method of claim 11 wherein, in response to a determination by the reputation platform that the review data is positive, the reputation platform is configured to initiate a review request action associated with the user.

13. The method of claim 12 wherein the review request action comprises sending an email to the user asking the user to post a review to a review site.

14. The method of claim 12 wherein the review request action comprises sending an instruction to a processor.

15. The method of claim 14 wherein the instruction comprises an instruction to display a request to the user asking the user's permission to post the review to a review site.

16. The method of claim 10 wherein the at least one action comprises a remedial action.

17. The method of claim 16 wherein the remedial action comprises sending an alert to a manager.

18. The method of claim 10 wherein determining whether the review data is indicative of a positive or a negative review occurs prior to transmitting the review data to the reputation platform.

19. A system, comprising:
- a processor configured to:
  - receive, from a mobile device, review data provided to the mobile device by a user who is solicited to provide a review for a business while the user is located on a premise of the business;
  - determine, based at least in part on the received review data and one or more thresholds, that at least one action should be attempted with respect to the user in person while the user is located on the business premise;
  - transmit an alert to the business premise that one or more personnel associated with the business premise should take the at least one action with respect to the user in person;
  - determine whether the review data indicates a positive review or negative review; and
  - in response to a determination that the review data indicates a positive review, commence a review request action;
  and
- a memory coupled to the processor and configured to provide the processor with instructions.

* * * * *

UNITED STATES PATENT AND TRADEMARK OFFICE
CERTIFICATE OF CORRECTION

PATENT NO. : 8,676,596 B1
APPLICATION NO. : 13/731064
DATED : March 18, 2014
INVENTOR(S) : Franson et al.

It is certified that error appears in the above-identified patent and that said Letters Patent is hereby corrected as shown below:

On The Title Page, Item (56) References Cited, U.S. Patent Documents, line 6, delete "May" after "Vander" and insert --Mey--, therefor.
    Page 2, column 2, line 40, delete "Marcy" after "Privacy Journal, 37.5 ('' and insert --March--, therefor.

Signed and Sealed this
Ninth Day of August, 2016

Michelle K. Lee
*Director of the United States Patent and Trademark Office*